US008158572B2

(12) United States Patent
Schubert et al.

(10) Patent No.: US 8,158,572 B2
(45) Date of Patent: Apr. 17, 2012

(54) LINEAR POLYDIMETHYLSILOXANE-POLYETHER COPOLYMERS WITH AMINO AND/OR QUATERNARY AMMONIUM GROUPS AND USE THEREOF

(75) Inventors: Frank Schubert, Neukirchen-Vluyn (DE); Wilfried Knott, Essen (DE); Michael Ferenz, Essen (DE); Klaus-Dieter Klein, Mülheim an der Ruhr (DE); Tobias Maurer, Velbert (DE); Ralph Scheuermann, Essen (DE); Bernard William Kluesener, Harrison, OH (US); Rajan Keshav Panadiker, West Chester, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 13/015,852

(22) Filed: Jan. 28, 2011

(65) Prior Publication Data

US 2011/0190190 A1 Aug. 4, 2011

Related U.S. Application Data

(60) Provisional application No. 61/299,485, filed on Jan. 29, 2010.

(51) Int. Cl.
*C11D 3/37* (2006.01)
(52) U.S. Cl. .................................. 510/466; 510/475
(58) Field of Classification Search .................. 510/466, 510/475
See application file for complete search history.

(56) References Cited

U.S. PATENT DOCUMENTS

| 4,081,384 A | 3/1978 | Pracht |
| 4,133,779 A | 1/1979 | Hellyer et al. |
| 4,228,042 A | 10/1980 | Letton |
| 4,234,627 A | 11/1980 | Schilling |
| 4,239,660 A | 12/1980 | Kingry |
| 4,260,529 A | 4/1981 | Letton |
| 4,483,779 A | 11/1984 | Llenado et al. |
| 4,483,780 A | 11/1984 | Llenado |
| 4,514,461 A | 4/1985 | Woo |
| 4,565,647 A | 1/1986 | Llenado |
| 4,681,704 A | 7/1987 | Bernardino et al. |
| RE32,713 E | 7/1988 | Woo |
| 4,767,547 A | 8/1988 | Straathof et al. |
| 4,882,220 A | 11/1989 | Ono et al. |
| 4,891,166 A | 1/1990 | Schaefer et al. |
| 4,895,964 A | 1/1990 | Margida |
| 4,917,920 A | 4/1990 | Ono et al. |
| 4,981,239 A | 1/1991 | Cappel et al. |
| 5,137,646 A | 8/1992 | Schmidt et al. |
| 5,143,288 A | 9/1992 | Kohler et al. |
| 5,145,842 A | 9/1992 | Driedger et al. |
| 5,306,434 A | 4/1994 | Schueller et al. |
| 5,332,528 A | 7/1994 | Pan et al. |
| 5,460,736 A | 10/1995 | Trinh et al. |
| 5,470,492 A | 11/1995 | Childs et al. |
| 5,474,690 A | 12/1995 | Wahl et al. |
| 5,476,599 A | 12/1995 | Rusche et al. |
| 5,486,634 A | 1/1996 | Hahn et al. |
| 5,545,340 A | 8/1996 | Wahl et al. |
| 5,545,350 A | 8/1996 | Baker et al. |
| 5,562,849 A | 10/1996 | Wahl et al. |
| 5,574,179 A | 11/1996 | Wahl et al. |
| 5,576,282 A | 11/1996 | Miracle et al. |
| 5,783,544 A | 7/1998 | Trinh et al. |
| 5,798,107 A | 8/1998 | Vogel et al. |
| 5,807,956 A | 9/1998 | Czech |
| 5,883,069 A | 3/1999 | Childs et al. |
| 5,929,026 A | 7/1999 | Childs et al. |
| 5,939,060 A | 8/1999 | Trinh et al. |
| 5,980,931 A | 11/1999 | Fowler et al. |
| 5,981,681 A | 11/1999 | Czech |
| 6,001,343 A | 12/1999 | Trinh et al. |
| 6,004,922 A | 12/1999 | Watson et al. |
| 6,008,181 A | 12/1999 | Cripe et al. |
| 6,020,303 A | 2/2000 | Cripe et al. |
| 6,022,844 A | 2/2000 | Baillely et al. |
| 6,060,443 A | 5/2000 | Cripe et al. |
| 6,077,318 A | 6/2000 | Trinh et al. |
| 6,093,856 A | 7/2000 | Cripe et al. |
| 6,121,165 A | 9/2000 | Mackey et al. |
| 6,136,769 A | 10/2000 | Asano et al. |
| 6,153,577 A | 11/2000 | Cripe et al. |
| 6,200,949 B1 | 3/2001 | Reijmer et al. |
| 6,207,141 B1 | 3/2001 | Pyles |
| 6,221,825 B1 | 4/2001 | Williams, Jr. et al. |

(Continued)

FOREIGN PATENT DOCUMENTS

| DE | 1 493 384 B2 | 3/1971 |
| EP | 0 017 122 B1 | 6/1983 |
| EP | 0 530 974 B1 | 7/1995 |
| WO | WO 98/35002 A1 | 8/1998 |
| WO | WO 98/35003 A1 | 8/1998 |
| WO | WO 98/35004 A1 | 8/1998 |
| WO | WO 98/35005 A1 | 8/1998 |
| WO | WO 98/35006 A1 | 8/1998 |
| WO | WO 99/05244 A1 | 2/1999 |
| WO | WO 00/47708 A1 | 8/2000 |
| WO | WO 02/092904 A1 | 11/2002 |
| WO | WO 2008/138363 A1 | 11/2008 |
| WO | WO 2011/091933 A1 | 8/2011 |

OTHER PUBLICATIONS

International Search Report; International Application No. PCT/US2011/022665; 3 pages; mailed May 12, 2011.

*Primary Examiner* — John Hardee
(74) *Attorney, Agent, or Firm* — James F. McBride; Gary J. Foose; Steven W. Miller

(57) ABSTRACT

Household care compositions having a linear polydimethylsiloxane-polyether copolymers with amino and/or quaternary ammonium groups, obtainable by the reaction of organopolysiloxanes functionalized with secondary aminoalkyl groups with the reaction products formed from compounds containing epoxy groups and amines, the use thereof and process for preparation thereof.

17 Claims, No Drawings

U.S. PATENT DOCUMENTS

| | | | |
|---|---|---|---|
| 6,274,540 B1 | 8/2001 | Scheibel et al. | |
| 6,279,834 B1 | 8/2001 | Fox et al. | |
| 6,306,812 B1 | 10/2001 | Perkins et al. | |
| 6,326,348 B1 | 12/2001 | Vinson et al. | |
| 6,361,752 B1 | 3/2002 | Demarest et al. | |
| 6,475,568 B1 * | 11/2002 | Czech | 427/386 |
| 6,482,358 B1 | 11/2002 | Kelsch et al. | |
| 6,482,994 B2 | 11/2002 | Scheper et al. | |
| 6,491,840 B1 | 12/2002 | Frankenbach et al. | |
| 6,492,322 B1 | 12/2002 | Cooper et al. | |
| 6,495,058 B1 | 12/2002 | Frankenbach et al. | |
| 6,495,498 B2 | 12/2002 | Niemiec et al. | |
| 6,551,986 B1 | 4/2003 | Littig et al. | |
| 6,573,233 B1 | 6/2003 | Altmann et al. | |
| 6,592,813 B1 | 7/2003 | Fox et al. | |
| 6,593,285 B1 | 7/2003 | Scheibel et al. | |
| 6,642,200 B1 | 11/2003 | Zhang et al. | |
| 6,645,479 B1 | 11/2003 | Shefer et al. | |
| 6,696,053 B1 | 2/2004 | Ma et al. | |
| 6,733,538 B1 | 5/2004 | Panandiker et al. | |
| 6,779,740 B1 | 8/2004 | Lentsch et al. | |
| 6,790,408 B2 | 9/2004 | Whitby et al. | |
| 6,844,309 B1 | 1/2005 | Sivik et al. | |
| 6,883,723 B2 | 4/2005 | Griese et al. | |
| 6,899,281 B1 | 5/2005 | Griese et al. | |
| 6,908,041 B2 | 6/2005 | Griese et al. | |
| 6,910,640 B2 | 6/2005 | Griese et al. | |
| 6,910,641 B2 | 6/2005 | Griese et al. | |
| 6,949,498 B2 | 9/2005 | Murphy et al. | |
| 6,956,017 B1 | 10/2005 | Catalan et al. | |
| 7,055,761 B2 | 6/2006 | Griese et al. | |
| 7,087,572 B2 | 8/2006 | Hubig et al. | |
| 7,093,772 B2 | 8/2006 | Griese et al. | |
| 7,119,057 B2 | 10/2006 | Popplewell et al. | |
| 7,135,451 B2 | 11/2006 | Corona, III et al. | |
| 7,186,680 B2 | 3/2007 | Caswell et al. | |
| 7,223,361 B2 | 5/2007 | Kvietok et al. | |
| 7,250,393 B2 | 7/2007 | Lentsch et al. | |
| 7,262,159 B2 | 8/2007 | Nguyen et al. | |
| 7,309,026 B2 | 12/2007 | Griese et al. | |
| 7,381,697 B2 | 6/2008 | Lentsch et al. | |
| 7,452,855 B2 | 11/2008 | Hubig et al. | |
| 7,456,145 B2 | 11/2008 | Lentsch et al. | |
| 7,625,857 B2 | 12/2009 | Ward et al. | |
| 7,799,752 B2 | 9/2010 | Ness et al. | |
| 2002/0066798 A1 | 6/2002 | Laudamiel-Pellet et al. | |
| 2003/0060390 A1 | 3/2003 | Demeyere et al. | |
| 2003/0126282 A1 | 7/2003 | Sarkar et al. | |
| 2003/0158344 A1 | 8/2003 | Rodriques et al. | |
| 2003/0165692 A1 | 9/2003 | Koch et al. | |
| 2003/0195133 A1 | 10/2003 | Shefer et al. | |
| 2003/0203829 A1 | 10/2003 | Shefer et al. | |
| 2003/0215417 A1 | 11/2003 | Uchiyama et al. | |
| 2003/0216488 A1 | 11/2003 | Uchiyama et al. | |
| 2004/0071742 A1 | 4/2004 | Popplewell et al. | |
| 2004/0071746 A1 | 4/2004 | Popplewell et al. | |
| 2004/0072719 A1 | 4/2004 | Bennett et al. | |
| 2004/0072720 A1 | 4/2004 | Brain et al. | |
| 2004/0087477 A1 | 5/2004 | Ness | |
| 2004/0106536 A1 | 6/2004 | Mane et al. | |
| 2004/0204337 A1 | 10/2004 | Corona et al. | |
| 2006/0252668 A1 | 11/2006 | Frankenbach et al. | |
| 2007/0281877 A1 | 12/2007 | Nguyen et al. | |
| 2008/0191370 A1 | 8/2008 | Pankhurst et al. | |
| 2008/0242584 A1 | 10/2008 | Wahl et al. | |
| 2008/0305982 A1 | 12/2008 | Smets et al. | |
| 2009/0247449 A1 | 10/2009 | Burdis et al. | |
| 2011/0021096 A1 * | 1/2011 | Falk | 442/59 |
| 2011/0091399 A1 | 4/2011 | Meyer et al. | |

* cited by examiner

LINEAR POLYDIMETHYLSILOXANE-POLYETHER COPOLYMERS WITH AMINO AND/OR QUATERNARY AMMONIUM GROUPS AND USE THEREOF

CROSS REFERENCE TO RELATED APPLICATION(S)

This application claims the benefit of U.S. Provisional Application No. 61/299,485, filed Jan. 29, 2010.

FIELD OF THE INVENTION

The invention relates to novel linear polydimethylsiloxane-polyether copolymers with amino and/or quaternary ammonium groups. It further relates to the use of these polymers as softeners for fabrics, for example wovens, especially textile wovens, tissue, nonwovens and/or fibers of natural and/or synthetic raw materials and/or leather, hair or hide, and to the use thereof in cosmetic applications, for example in haircare, skincare and personal hygiene.

BACKGROUND OF THE INVENTION

Softeners for fabrics, for example wovens, textile wovens, knits, nonwovens and/or fibers of natural and/or synthetic raw materials, are substances which impart a soft supple hand to the materials mentioned. Particularly suitable softeners are polysiloxanes with quaternary ammonium groups. By virtue of electrostatic attractive forces, the ionic groups anchor the siloxane to the fiber. In this way, friction is reduced and the desired softener effect is achieved. When the siloxane is applied in the form of microemulsions, it can additionally penetrate into the fiber and imparts inner softness and fullness thereto.

There are specific formulations for the care of damaged hair, such as hair rinses, hair repair treatments, shampoos, leave-on conditioners, etc., which in particular improve the compatibility, hand and shine of damaged hair. Such conventional haircare compositions comprise principally cationic surfactants based on alkylammonium, polymers, waxes or oils, or silicone oils. The efficacy of these compounds can be attributed to hydrophobization of the hair surface, among other causes.

For all these compositions, a good care action (conditioning) of the hair is achieved, but the appearance, especially the shine of the hair, is not improved by the care products, but in some cases even worsened.

There is therefore a need for versatile active ingredients for personal hygiene and care products, such as shampoos, hair treatment compositions and hair aftertreatment compositions, which, in addition to cleaning action, improve the care of the hair and simultaneously impart good shine, which protect the hair from damage to the hair structure and which minimize structural damage already caused to the hair, resulting from environmental influences and from shaping and coloring treatments.

Polysiloxanes with quaternary ammonium groups are known as additives for haircare. For example, DE 14 93 384, EP 0 017 122 and U.S. Pat. No. 4,895,964 describe structures in which siloxanes are modified with pendant ammonium groups distributed randomly over the polymer. These compounds have the disadvantage that they do not possess any marked silicone character, and good efficacy is not observed.

A more marked silicone character is possessed by cationic polysiloxanes as described in DE 37 19 086 and EP 0 294 642.

In the structures described in DE 37 19 086 and in EP 0 294 642, the quaternary functions are bonded terminally to the polysiloxane. Such compounds offer advantages with regard to the action thereof as conditioners, both for hair and textiles and for hard surfaces. The use of such compounds in cosmetic formulations is described, for example, in EP 0 530 974, EP 617 607, EP 1 080 714, WO 2001/082879 and U.S. Pat. No. 6,207,141.

However, the structures described there possess only two cationic groups. Owing to the relatively minor electrostatic interaction of the polysiloxanes provided with two charge centers present at their termini, the affinity thereof for particular surfaces and, as a consequence thereof, also the substantivity thereof, i.e. the tendency thereof to become anchored permanently thereto, is comparatively low.

Polysiloxanes with pendant quaternary ammonium groups distributed randomly over the polymer and the use thereof as textile softeners are described, for example, in DE-B 14 93 384. These compounds have the disadvantage that they do not possess marked silicone character, and good efficacy as a textile softener is not observed.

A significantly more marked silicone character is possessed, in contrast, by cationic silicones as described in EP 0 294 642. EP 0 294 642 describes structures in which the quaternary functions are bonded terminally to a siloxane segment. When a textile is treated with such compounds, it receives good softness, but the siloxane is removable again easily from the corresponding textile owing to its low substantivity, for example by washing operations. In contrast to the domestic fabric softener, it is, however, desirable for industrial textile end finishing that the siloxane remains on the textile even after the wash and the softness is thus not lost.

Addressing the aspect of increased hydrophilicity, U.S. Pat. No. 5,807,956 and U.S. Pat. No. 5,981,681 claim non-hydrolysable block copolymers of the $(AB)_nA$ type with alternating units consisting of polysiloxane and amino-polyalkylene oxide, and a route for preparation thereof. For instance, noble metal-catalysed hydrosilylation produces SiC linkages of dihydrogenpolydimethylsiloxanes with olefins bearing epoxy groups, and the epoxy-terminated siloxanes thus obtained are reacted with amino-terminated polyalkylene oxides. Another alternative is the hydrosilylating linkage of $\alpha,\omega$-dihydrogenpolydimethylsiloxanes with epoxy-terminated allyl polyethers and the subsequent reaction of the epoxy-functionalized siloxanes thus obtained with diamines.

The teaching of WO 02/092904 relates to compositions consisting of nonhydrolysable block-type copolymers which do not possess an $(AB)_n$ structure, and which are obtained by the reaction between polydimethylsiloxanes A having epoxy groups and polyalkylene oxides B bearing epoxy termini in the presence of primary amines and/or mixtures consisting of primary and secondary amines. The presence of different epoxy substrates leads, in the presence of the aminic reactants, to a virtually uncontrollable, self-organized polyaddition process which, beyond an unachievable strict (A(amine)B)$_n$ structure, leads to a copolymer which, in varying population, has both homogeneously distributed (A(amine)A) and (B(amine)B) and heterogeneously distributed (A(amine)B) diades each linked aminically. Owing to the siloxane reactants provided with epoxy functions, the copolymer structures thus obtained are capable of linkage of the particular siloxanyl units via an ether function to the aminoorganic radicals of the copolymer. With the option of further elaboration for neutralization and/or quaternization, the substantivity for textile or fibrous surfaces can be adjusted. A disadvantage for use is the intrinsically high viscosity which is characteristic of these random copolymer structures.

SUMMARY OF THE INVENTION

Recognizing the disadvantages of the prior art explained, it is an object of this invention to find novel copolymers based on polysiloxanes with amino and/or quaternary ammonium groups, which, coupled with good synthetic accessibility, enable a multitude of structures which can be determined in a controlled manner and hence also profiles of properties which can be adjusted over a wide range.

In a departure from the principle of randomness accepted in the teaching of WO 02/092904, the formation of clearly sequenced copolymer structures, which comprise aminic or ammonium functions, siloxane segments and polyoxyalkylene segments, shall be enabled. The principle of formation of the copolymers shall additionally give the option of freely selecting the content of incorporated nitrogen within certain limits.

The object of the invention is achieved by novel linear polydimethylsiloxane-polymer copolymers including household care compositions comprising the same.

The invention therefore provides novel linear polydimethylsiloxane-polyether copolymers with amino and/or quaternary ammonium groups, which are obtainable by the reaction of organopolysiloxanes functionalized with secondary aminoalkyl groups with the reaction products formed from compounds containing epoxy groups and amines.

DETAILED DESCRIPTION OF THE INVENTION

The affinity for the textile and/or fibrous carrier and ultimately, as a result of this, the substantivity of the copolymer structure claimed in accordance with the invention thereon is determined by the defined distance of the nitrogen functions which enter into electrostatic interaction from the surface of the substrate. In other words, the synthesis route claimed in accordance with the invention leads to structurally balanced softener additives which have neither an undesired accumulation of siloxane functions nor of amino organic functions. As a result, the process claimed here for preparation and the copolymer which results therefrom differ from the copolymer compositions according to the teaching of WO 02/092904, which can even contain, as a consideration of the extreme case, purely organosilicone (A(amine)A) and purely organic (B(amine)B) compounds. The presence of these compounds characterized by diametrically opposed polarity causes undesired turbidity and separation phenomena.

More particularly, the method indicated in U.S. Pat. No. 5,486,634 for preparing the organopolysiloxanes functionalized with secondary aminoalkyl groups is found to be a favorable route for these reactants.

The invention therefore further provides a process for preparing the inventive copolymers. The preparation of the inventive copolymers proceeds stepwise and is characterized in that
a) a diepoxide is first reacted with at least one amine compound to give a chain-extended adduct bearing a terminal glycidyl group, the molar ratio of diepoxide to amine being variable but at least greater than 1:1, and
b) this intermediate is then reacted with a linear polysiloxane bearing a terminal secondary amino group,
c) optionally, the nitrogen atoms can be completely or partially quaternized at any point in this process by adding acids or alkylating reagents, and
d) also optionally, water or organic compounds selected from the group of the polyethers, polyols or alcohols can be added as diluents, emulsifiers or modifiers.

The epoxy components used in this process according to the invention are preferably diepoxides or diglycidyl ethers of the formula (1)

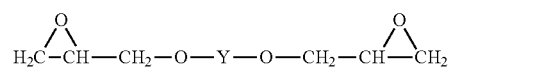

Formula (1)

where
Y is any divalent organic radical, preferably a divalent hydrocarbon radical which may be interrupted by oxygen atoms. More particularly, Y is a divalent polyether radical of the $-(CH_2-CHR^2-O)_m-CH_1-CHR^2-$ type, where m is an integer from 0 to 50 and $R^2$ is hydrogen or an alkyl group having 1-4 carbon atoms.

Particularly suitable are diglycidyl ethers of polypropylene glycols and polyethylene glycols, as obtainable, for example, from DOW (D.E.R® 732, D.E.R® 736) and DOW Epoxy Systems (Polypox® R19—all trade marks mentioned are marks of the Dow Chemical Corp.). It is also possible to use different diepoxides of the formula (1) in a mixture.

Suitable reaction partners for such diglycidyl ethers are in principle all amine compounds with two reactive hydrogen atoms bonded to the nitrogen. Preference is given to using di-secondary amines of the formula (2)

Formula (2)

where
$R^3$ is independently a linear or branched aliphatic hydrocarbon radical which may be interrupted by heteroatoms such as O and N, or which may in turn be substituted by N- or O-containing groups or is a cycloaliphatic radical; $R^3$ is monovalent when p is 0, or divalent when p is 1; $R^3$ is preferably a hydrocarbon radical, more preferably an alkyl or alkylene group having 1 to 18 carbon atoms,
Z is a divalent linear or branched hydrocarbon radical which may be interrupted by heteroatoms such as O and N or may in turn be substituted by N- or O-containing groups; Z is preferably an alkylene group having 2 to 18 carbon atoms,
$Z^1$ is independently a Z radical and
p is either 0 or 1.

When p is 1, formula (2) encompasses cyclic amines, the two nitrogen atoms being constituents of this heterocyclic fragment. This includes piperazine, which is used with preference. Suitable linear di-secondary amines are, for example, N,N'-dimethylhexamethylene-1,6-diamine and N,N'-dimethyltetramethylene-1,4-diamine.

In the context of the present invention, at least one diepoxide component of the formula (1) in a molar excess is reacted with at least one amine compound of the formula (2) to give a chain-extended adduct bearing terminal glycidyl groups. The molar ratio of diepoxide to amine is variable and is at least greater than 1:1 and is preferably 10:1 to 1.1:1 and especially 6:1 to 1.5:1. The smaller the diepoxide excess, the higher the value of index x in formula (6) and the chain length of the resulting adduct. The higher the diepoxide excess, the more unadducted diglycidyl compounds are present in the reaction mixture which forms. In each case, the reaction product is a mixture of adducts with a molar mass distribution. The reaction can be performed within the temperature range of 20-180° C., preferably at 50 to 120° C. It is most favorable to initially charge the quantitatively predominant component—usually the diepoxide—and to add the second component—generally the amine—with stirring and optionally cooling. It is possible, but usually unnecessary, to perform the reaction in a solvent. Should this be required, for example owing to high viscosity, suitable solvents are, for example, ethanol, propanol, isopropanol, butanol, THF, acetone, toluene, etc. When the reaction is performed under inert conditions, such as under nitrogen, light-colored or else pale yellowish end products are obtained.

To prepare the inventive copolymers, linear polysiloxanes which have terminal secondary amine groups and are of the formula (3) are used

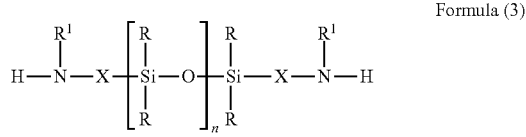

Formula (3)

where

R is an alkyl radical having 1-8 carbon atoms, preferably a methyl group, $R^1$ is any hydrocarbon radical, preferably an alkyl radical having 1 to 20 carbon atoms, more preferably an alkyl radical having 1 to 4 carbon atoms, especially a methyl or ethyl group, X is a divalent linear or branched hydrocarbon radical which has 1-20 carbon atoms and may be interrupted by nitrogen atoms or aminic groups, and n is an integer from 1 to 500, preferably an integer from 5 to 300, more preferably an integer from 10 to 200.

Such polysiloxanes functionalized with terminal secondary amine groups are preparable, for example, by the route described in U.S. Pat. No. 5,486,634. Especially suitable in the context of the present invention are those amine-functional polysiloxanes which are obtainable by hydrosilylating N-ethylmethylallylamine onto α,ω-SiH-siloxanes. $R^1$ here corresponds to an ethyl group, X to the $CH_2$—$CH(CH_3)$—$CH_2$ fragment.

The reaction between at least one aminosiloxane of the formula (3) and at least one diepoxide-amine adduct is preferably accomplished in a solvent such as isopropanol, ethanol, propanol or THF, in order to compatibilize the two reactants. The stoichiometry is in principle as desired, but preference is given to reacting the two components in an approximately equimolar ratio. The relation of secondary amino groups from the siloxane of the formula (3) to the epoxy groups of the diepoxide-amine adduct is preferably 1.5:1 to 0.7:1, more preferably 1.3:1 to 0.9:1. According to which of the two reactants is possibly used in excess, copolymers with linear structures are formed with terminal epoxy or amine groups. To achieve more storage-stable products, it is advantageous to use the aminosiloxane in a slight excess relative to the diepoxide-amine adduct component. The reaction is accomplished at temperatures between 20° C. and 180° C., preferably at 60° C. to 120° C. It is possible either to initially charge the siloxane compound and to add the diepoxide-amine adduct, or to proceed in the reverse metering sequence. The solvent can remain in the product at the end or, if required, be removed by processes known to those skilled in the art, for example by distillation. Anywhere in the preparation process, most favorably after the end of the above-described reaction in the system still comprising solvent, it is optionally possible to add acids, preferably carboxylic acids such as formic acid, acetic acid, propionic acid, lactic acid, oxalic acid, citric acid or tartaric acid, aromatic carboxylic acids such as benzoic acid or salicylic acid, but equally also inorganic acids such as phosphoric acid, sulphuric acid, toluenesulphonic acid, methanesulphonic acid or hydrochloric acid, which forms quaternary ammonium groups. The amount of the acid used, based on nitrogen, is variable and is preferably between 0.01 mol and 2 mol, preferably 0.1 to 1.5 mol, per nitrogen atom.

In the context of the inventive teaching, it is likewise possible to isolate the non-neutralized copolymer and then, as detailed above, to neutralize it or undertake a quaternization of the amino groups. In the quaternization of the amine functions, alkylating reagents such as alkyl halides or alkyl sulphates (e.g. dimethyl sulphate) are typically used. Accompanying the quaternization, the copolymer, compared to the unmodified aminic precursor or salts thereof, gains substantivity on textile or fibrous substrates and also influence on the tendency thereof to become electrostatically charged The process according to the invention allows, in a simple manner, formation of strictly linear copolymer structures in which siloxane units and amine-functional organic sequences are present in strictly regularly alternating sequence. The hydrophobic siloxane character can be adjusted almost as desired through the siloxane chain length, and the hydrophilic character and the amine content through the selection of the diepoxide-amine stoichiometry in the precursor. Thus, it is possible to reproducibly produce structures which are exactly defined in terms of sequence of the repeat units in the copolymer chain.

The invention therefore provides a process for preparing novel linear copolymer structures consisting of alternating polysiloxane blocks and amino organic blocks, the nitrogen atoms of which are optionally in the form of quaternary ammonium groups, in which a) a diglycidyl ether of the formula (1) is first reacted in a molar excess with at least one amine compound of the formula (2) to give a chain-extended adduct bearing terminal glycidyl groups, the molar ratio of diepoxide to amine being variable and preferably being 10:1 to 1.1:1, and b) this intermediate is subsequently reacted with a linear polysiloxane which bears terminal secondary amino groups and is of the formula (3), preferably in a molar ratio of 1.5:1 to 0.7:1 and optionally in a solvent, c) optionally, the nitrogen atoms can be completely or partly quaternized anywhere in this process, most favorably after the end of the above-described reaction in the system still comprising solvent, optionally by adding acids such as preferably carboxylic acids, but also inorganic acids or alkylating reagents, such as alkyl halides or alkyl sulphates, and d) likewise optionally, water or organic compounds such as polyethers, polyols or alcohols are added as diluents, emulsifiers or modifiers.

The copolymers prepared in accordance with the invention are thus compounds of the general formula (4)

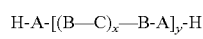

Formula (4)

where
A is a siloxane fragment from the structure of the aminosiloxane of the formula (3) according to formula (5)

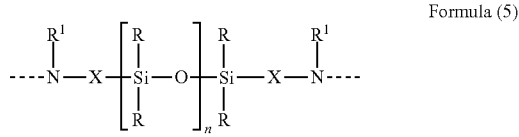

Formula (5)

B is an organic fragment which arises from the epoxy ring opening of the diglycidyl ether of the formula (1) according to formula (6)

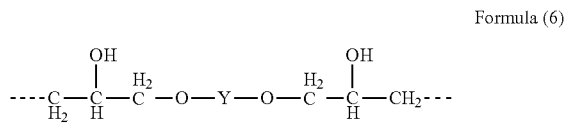

Formula (6)

C is a fragment from the amine structure of the formula (2) according to formula (7)

Formula (7)

and where the X, Y, Z, $Z^1$, R, $R^1$, $R^2$ and $R^3$ radicals and the n, m and p indices are each as defined above,
x is from 0.1 to 10, preferably 0.2 to 5,
y is from 1.1 to 50, preferably 1.2 to 30.

Formula (4) illustrates not only the strict block sequence of the repeat units A, B and C defined by the preparation process according to the invention, but also the attachment of the siloxane body to the amino organic block exclusively via an amine group of the —X—N($R^1$)— type, which clearly distinguishes the inventive copolymers from the non-(AB)$_n$ structures in WO 02/092904.

The indices represented in the formulae shown here and the value ranges of the indices reported should be interpreted as the mean values of the possible statistical distribution of the structures actually present and/or mixtures thereof. This is also true of those structural formulae shown in exact form per se.

The invention further provides the copolymers of the formula (4) preparable by the process presented, and the derivatives thereof which bear ammonium groups and have been quaternized with acids and/or alkylating agents.

It is familiar to the person skilled in the art that the compounds are present in the form of a mixture with a distribution of the indices mentioned regulated essentially by statistical laws.

Depending on the siloxane structure and the chain length thereof, the polysiloxanes with amino or quaternary ammonium groups are not self-emulsifiable or soluble in water. They can be introduced into an aqueous formulation through additions of emulsifiers and/or solvents. The emulsifiers used are typically fatty alcohol ethoxylates with degrees of ethoxylation between 3 and 12, specifically in a ratio of copolymer to the fatty alcohol ethoxylate of 5:1 to 1:1. It is equally possible for solvents to be used, for example high-boiling glycols such as dipropylene glycol or butyldiglycol.

The invention therefore further provides compositions which comprise the inventive copolymers, especially concentrates, compounds/emulsion concentrates and/or aqueous formulations, aqueous emulsions and/or solutions thereof, a formulation or emulsion in organic compounds such as polyethers, polyols, alcohols.

The invention further provides for the use of the inventive compounds, obtainable by the process according to the invention, as non-permanent or permanent softeners for fabrics selected, for example, from the group comprising wovens, textile wovens, knits, nonwovens, tissue (paper fiber) and/or fibers of natural and/or synthetic raw materials and/or leather and/or hair and/or hide, in which case the softener can optionally also impart hydrophilic properties to the fabrics treated therewith. More particularly, the inventive compounds impart hydrophilic properties with simultaneous achievement of a good hand and good permanence.

It is a further object of the invention to provide compounds and formulations comprising these compounds, which are capable both of improving properties such as compatibility, softness, volume, shapeability, manageability, disentangleability of undamaged and damaged hair, and/or else of imparting an appealing shine to the hair. The compounds should thus exhibit an improved or at least equally good individual effect, but overall an improved combined effect of mechanical and other properties.

This invention further provides for the use of the copolymers of the general formula (4) or of the mixtures comprising these compounds in shine-improving care formulations, as hair treatment compositions and hair aftertreatment compositions to be rinsed out of or to remain in the hair, for example in shampoos with or without marked conditioning action, conditioners, 2 in 1 shampoos, rinses, hair repair treatments, hair masks, styling aids, styling compositions, hair drying lotions, hair-setting compositions, permanent wave compositions, hair smoothing compositions and/or compositions for dyeing the hair.

A further advantage of the inventive use is that the polysiloxanes with quaternary functions of the formula (4) can exert outstanding conditioning effects on the skin. This conditioning effect on the skin can prevent a dry, brittle or rough state of the skin after uses of a cosmetic aqueous surfactant formulation, and achieve a pleasant, silky-smooth skinfeel.

The present invention further provides cosmetic, dermatological and pharmaceutical formulations and care and cleaning compositions which are obtained by the use of the inventive copolymers and comprise, for example, at least one additional component selected from the group comprising emollients, emulsifiers and surfactants, thickeners/viscosity regulators/stabilizers, UV light protection filters, antioxidants, hydrotropes (or polyols), solids and fillers, film formers, pearlescent additives, active deodorant and antiperspirant ingredients, insect repellents, self-tanning agents, preservatives, conditioners, perfumes, dyes, active cosmetic ingredients, care additives, superfatting agents, solvents. Substances which can be used as illustrative representatives of the individual groups are known to those skilled in the art and can be taken, for example, from German Application DE 102008001788.4. This patent application is hereby incorporated by reference and is therefore considered to be part of the disclosure.

The process according to the invention permits, through the control of block structures of very different sequence length, the siloxane content in relation to the organic component and to the number of the optionally quaternized nitrogen atoms to be tailored within wide limits flexibly to the desired field of application. For example, copolymers with a high silicone content give rise to a pleasant hand of the woven fabric treated therewith, and they simultaneously have a relatively low viscosity which allows such compounds to be formulated in aqueous form.

More particularly, the inventive linear organomodified polysiloxanes impart a very good hydrophilic softness to woven textile fabrics, and possess an increased permanence on textiles. Furthermore, high rebound elasticity and improved crease recovery of a fabric thus finished are to be considered as further positive properties.

The inventive copolymers can be used and optionally applied, for example, as softeners for textiles and woven fabrics in the form of concentrates, compounds/emulsion concentrates, formulations and liquors produced therefrom, the copolymers being used in such systems in proportions of 0.5 to 99% by weight, preferably of 3 to 70% by weight, in particular of 5 to 50% by weight, based on the overall formulation.

"Liquor" represents a usually aqueous liquid in which textiles are washed, bleached, dyed or impregnated. The term "liquor" means the entirety of solvent (usually water) and all constituents present (dissolved, emulsified or dispersed) therein, for example dyes, emulsifiers and further assistants. The entirety of the constituents dissolved in the liquor is commonly also referred to as the solids content, the solids content specifying the drying residue after evaporation of the volatile constituents (at about 100° C.-105° C.). The amount of the components of a liquor is usually reported in g/l for liquids or % (based on the fabric weight).

In the textile sector, a treatment liquor is quite generally referred to as the bath (usually aqueous) in which (or with which) the woven fabric is finished with one or more (surface-active) substances. In addition to the main systems, there are further application forms such as spray application, knife-coating or roller application, according to the end use and hence viscosity of the product.

For aqueous systems, principally two systems are used:
For substantive, i.e. cationic, products—exhaustion processes: here, in principle like the fabric softener in a washing machine, the woven fabric is agitated in the liquor at a particular temperature for a particular time. Subsequently, the liquor is discharged and the woven fabric is dried.

For nonsubstantive and substantive products—padding application, for example with a Mat this HVF laboratory padder; here, the woven fabric is passed through the liquor and squeezed between the rollers (by the mangle principle) to a residual moisture content and then dried.

The invention therefore further provides a concentrate, a compound/emulsion concentrate, a formulation or an emulsion according to the definitions which follow.

Concentrate refers to the virtually pure copolymer compound of the formula (4) with a content of about 90-100% by weight, which is admixed with only minor proportions of solvents—these are generally not soluble in water and not self-emulsifiable either.

Compounds or emulsion concentrates contain 50-90% by weight, preferably 50-80% by weight, of the copolymer compound and, as further constituents, water and/or solvents selected from the group of the glycols, unbranched and/or branched alcohols and/or alkyl ethers having 1 to 6 carbon atoms and optionally one or more nonionic emulsifiers, for example an alcohol ethoxylate having 3-25 ethylene oxide units. Compounds and emulsion concentrates are generally water-soluble or self-emulsifiable.

Formulations and/or (aqueous) emulsions contain 5-20% by weight of the inventive copolymer, solvents, emulsifiers (including cationic or amphoteric emulsifiers), water. The solids content of these formulations or emulsions is generally about 40% by weight.

The aforementioned concentrates, compounds and/or formulations/emulsions are used, by dilution in water, to produce the (application) liquors (application/finishing baths) at the manufacturing premises/finishing premises. Typical liquor concentrations in the case of padding application are, for example, 5-80 g of formulation/emulsion per liter of liquor solution or application liquor.

The inventive copolymers can be used in haircare systems in combination with other active ingredients and assistants. According to the end use, such compositions are those comprising 2 to 25% by weight of one or more wash-active surfactants from the group of the anionic, nonionic, amphoteric or zwitterionic surfactants, 0.5 to 10% by weight of one or more emulsifiers, 0.5 to 10% by weight of one or more bodying agents, 0.5 to 10% by weight of one or more, preferably cationic, surfactants or emulsifiers, 0.5 to 20% by weight of one or more cosmetic oils, silicone oils or emollients, and customary assistants and additives in customary concentrations, and additionally comprising one or more active hair cosmetics ingredients selected from the group of the cationic polymers, for example quaternized cellulose and derivatives thereof, chitosan and derivatives thereof, cationic alkylglycosides, cationic guar derivatives, polymers of dimethyldiallylammonium salts and copolymers thereof with esters and amides of acrylic acid and methacrylic acid, copolymers of vinylpyrrolidone with quaternized derivatives of dialkylaminoalkyl acrylate and methacrylate, for example diethyl sulphate-quaternized vinylpyrrolidone-dimethylaminoethyl methacrylate copolymers, vinylpyrrolidone-vinylimidazolium methochloride copolymers, terpolymers of the vinylpyrrolidone, caprolactam and acrylamide monomers, quaternized polyvinyl alcohol and those polymers known by the INCI designations Polyquaternium-2, Polyquaternium-17, Polyquaternium-18, Polyquaternium-27 and Polyquaternium-37, cationic or nonionic protein hydrolysates of vegetable or animal origin based on keratin, collagen, elastin, wheat, rice, soy, milk, silk, maize or further silicone derivatives, for example Dimethiconol or Dimethicone (INCI designations for polydimethylsiloxanes) and modified silicones which may be terminally functionalized (INCI prefix Bis-) and/or graft-functionalized, namely, for example, alkoxysilicones and alkylsilicones with long-chain alkyl groups, polyoxyalkyl-modified silicones such as PEG/PPG-3/10 Dimethicone or Bis-PEG/PPG-20/20 Dimethicone with or without alkyl ether group and esters thereof, for example Dimethicone PEG-7 Cocoate and polyfunctionalized silicones, for example Cetyl PEG/PPG-10/1 Dimethicone or Methyleugenyl PEG-8 Dimethicone, and additionally silicone copolymers with acrylates, including those copolymers with and without alkyl modification, branched silicone derivatives such as Dimethicone/Silsesquioxane Copolymer, crosslinked silicone copolymers such as Dimethicone Crosspolymer, Alkyl Dimethicone/Divinyldimethicone Crosspolymer, Cetearyl Dimethicone Crosspolymer or Cetearyl Dimethicone/Vinyl Dimethicone Crosspolymer, amino-functionalized silicones such as Amodimethicone, Aminopropyl Dimethicone, PEG-7 Amodimethicone, Methoxy PEG/PPG-7/3 Aminopropyl Dimethicone or ionically modified silicones such as Dimethicone Propyl PG-Betaine, vitamins, panthenol, pyrrolidonecarboxylic acid, bisabolol, plant extracts, creatine, ceramides and UV absorbents.

Further configurations and subjects of the invention are evident from the claims, the disclosure-content of which is fully incorporated into this description.

The inventive copolymers with amino and/or quaternary ammonium groups and the process for preparation thereof are described by way of example hereinafter, without intention that the invention be restricted to these illustrated embodiments.

When ranges, general formulae or compound classes are specified below, these shall encompass not only the corresponding ranges or groups of compounds mentioned explicitly, but also all sub-regions and sub-groups of compounds which can be obtained by selecting individual values (ranges) or compounds.

Experimental Section:

For the inventive preparation of the copolymers, the following linear aminosiloxanes were used, which were obtained by the process described in U.S. Pat. No. 5,486,634, by hydrosilylating the corresponding —SiH-polydimethylsiloxanes with N-ethylmethylallylamine:

| Aminosiloxane 1 | Aminosiloxane 2 | Aminosiloxane 3 |
|---|---|---|
| Mean molar mass 6100 g/mol | Mean molar mass 3900 g/mol | Mean molar mass 2400 g/mol |
| approx. 80 dimethylsiloxy units in the polymer chain | approx. 50 dimethylsiloxy units in the polymer chain | approx. 30 dimethylsiloxy units in the polymer chain |

The diepoxide used was a polypropylene glycol diglycidyl ether from DOW Epoxy Systems (Polypox® R19) with an epoxide equivalent weight of 329 g/mol and an epoxide number of 171 mg KOH/g.

The viscosities were measured on the basis of DIN 53019 with a Brookfield (model LVT) rotational viscometer at 25° C.

Determination of the Siloxane Quat Nitrogen Content:

The quaternary nitrogen is determined by means of potentiometric titration with a dodecylsulphate solution as the titrant using an electrode combination consisting of a special solvent-resistant sensor electrode, for example the Surfactrode Resistant (Metrohm AG), and a reference electrode (Ag/AgCl cartridge double junction, Metrohm AG). The sample to be determined for quat nitrogen is weighed into a titration beaker with an accuracy of 0.1 mg. After dilution in 10 ml of MIBK, 10 ml of denatured ethanol and 0.2 ml of TEGO® add (from Metrohm AG Art. No. 6.2317.100) are pipetted in, then 10 ml of pH 10 buffer solution are added and the mixture is diluted with 80 ml of dist. water. This is followed by titration on a titroprocessor against 0.005 molar sodium dodecylsulphate solution. Taking account of the consumption of this titer solution and the weight, the content of quaternary nitrogen is determined.

Preparation of the Diepoxide-Diamine Adducts:

Adduct 1:

A glass flask is initially charged with 400 g of the Polypox® R19 diepoxide which are heated to 80° C. with nitrogen inertization. 25.6 g of a piperazine (68% in water) molten at approx. 50° C. are added in portions while stirring and cooling within 1 h. Continued reaction for 2 h forms a yellowish, clear reaction product (viscosity at 25° C.: 1020 mPas).

Adduct 2:

A glass flask is initially charged with 400 g of the Polypox® R19 diepoxide which are heated to 80° C. with nitrogen inertization. 30.4 g of a piperazine (68% in water) molten at approx. 50° C. are added in portions while stirring and cooling within 1 h. Continued reaction for 2 h forms a yellowish, clear reaction product (viscosity at 25° C.: 1100 mPas).

Adduct 3:

A glass flask is initially charged with 400 g of the Polypox® R19 diepoxide which are heated to 80° C. with nitrogen inertization. 38.0 g of a piperazine (68% in water) molten at approx. 50° C. are added in portions while stirring and cooling within 1 h. Continued reaction for 2 h forms a yellowish, clear reaction product (viscosity at 25° C.: 2870 mPas).

Preparation of the Inventive Copolymers:

Copolymer 1:

2500 g of aminosiloxane 1 and 2500 g of isopropanol are initially charged in a glass flask equipped with a reflux condenser and heated to 80° C. with nitrogen blanketing. 383.8 g of adduct 1 are added while stirring within 45 min. After continued reaction at 80-82° C. (reflux) for 2 h, the reflux condenser is exchanged for a distillation system, and isopropanol is removed by distillation at bottom temperatures up to 110° C. and vacuum of not less than 20 mbar. After decompressing with nitrogen and cooling to <80° C., 16.7 g of acetic acid are added while stirring. After 20 min of stirring time, the clear yellowish product is discharged (viscosity at 25° C.: 8500 mPas). The siloxane quat nitrogen content determined by titrimetry corresponds to theory.

Copolymer 2:

250 g of aminosiloxane 2 and 250 g of isopropanol are initially charged in a glass flask equipped with a reflux condenser and heated to 80° C. with nitrogen inertization. 67.2 g of adduct 2 are added while stirring within 45 min. After continued reaction at 80-82° C. (reflux) for 2 h, the reflux condenser is exchanged for a distillation system, and isopropanol is removed by distillation at bottom temperatures up to 110° C. and vacuum of not less than 20 mbar. After decompressing with nitrogen and cooling to <80° C., 1.8 g of acetic acid are added while stirring. After 20 min of stirring time, the slightly turbid yellowish product is discharged (viscosity at 25° C.: 5150 mPas). The siloxane quat nitrogen content determined by titrimetry corresponds to theory.

Copolymer 3:

250 g of aminosiloxane 1 and 250 g of isopropanol are initially charged in a glass flask equipped with a reflux condenser and heated to 80° C. with nitrogen inertization. 52.2 g of adduct 3 are added while stirring within 45 min. After continued reaction at 80-82° C. (reflux) for 2 h, the reflux condenser is exchanged for a distillation system, and isopropanol is removed by distillation at bottom temperatures up to 110° C. and vacuum of not less than 20 mbar. After decompressing with nitrogen and cooling to <80° C., 1.8 g of acetic acid are added while stirring. After 20 min of stirring time, the slightly turbid yellowish product is discharged (viscosity at 25° C.: approx. 10 500 mPas). The siloxane quat nitrogen content determined by titrimetry corresponds to theory.

Copolymer 4:

250 g of aminosiloxane 3 and 250 g of isopropanol are initially charged in a glass flask equipped with a reflux condenser and heated to 80° C. with nitrogen inertization. 97.5 g of adduct 1 are added while stirring within 45 min. After continued reaction at 80-82° C. (reflux) for 2 h, the reflux condenser is exchanged for a distillation system, and isopropanol is removed by distillation at bottom temperatures up to 110° C. and vacuum of not less than 20 mbar. After decompressing with nitrogen and cooling to <80° C., 2.3 g of acetic acid are added while stirring. After 20 min of stirring time, the clear yellowish product is discharged (viscosity at 25° C.: 4200 mPas). The siloxane quat nitrogen content determined by titrimetry corresponds to theory.

Copolymer 5:

150 g of aminosiloxane 1 and 150 g of isopropanol are initially charged in a glass flask equipped with a reflux condenser and heated to 80° C. with nitrogen blanketing. 23.0 g of adduct 1 are added while stirring within 10 min. After continued reaction at 80-82° C. (reflux) for 2.45 h, the reflux condenser is exchanged for a distillation system, and isopropanol is removed by distillation at bottom temperatures up to 110° C. and vacuum of not less than 20 mbar. After decompressing with nitrogen and cooling to <80° C., 1.6 g of acetic acid are added while stirring. After 20 min of stirring time, the clear yellowish product is discharged (viscosity at 25° C.: 9000 mPas). The siloxane quat nitrogen content determined by titrimetry corresponds to theory.

Copolymer 6:

150 g of aminosiloxane 1 and 150 g of isopropanol are initially charged in a glass flask equipped with a reflux condenser and heated to 80° C. with nitrogen blanketing. 25.0 g of adduct 1 are added while stirring within 15 min. After continued reaction at 80-82° C. (reflux) for 2 h, the reflux condenser is exchanged for a distillation system, and isopropanol is removed by distillation at bottom temperatures up to 110° C. and vacuum of not less than 20 mbar. After decompressing with nitrogen and cooling to <80° C., 1.0 g of acetic acid are added while stirring. After 20 min of stirring time, the yellowish opaque product is discharged. The siloxane quat nitrogen content determined by titrimetry corresponds to theory.

Use Examples

General Formulation:

5-50% by weight of the aminosiloxane are initially charged in a beaker with propeller stirrer while stirring. Subsequently, in this order, 5-25% by weight of dipropylene glycol or butyldiglycol, 3-15% by weight of a fatty alcohol ethoxylate with a degree of ethoxylation of 6, are added while stirring. Finally, the mixture is made up to 100% by weight with water.

Formulation 1—Inventive:

20 parts by weight of the inventive copolymer 1 with quaternary ammonium groups from example 1 are initially charged in a beaker with propeller stirrer while stirring. Subsequently, in this order, 10 parts of dipropylene glycol, 10 parts of a fatty alcohol ethoxylate with a degree of ethoxylation of 6, are added while stirring. Finally, the mixture is made up with 60 parts of water. This gives a clear low-viscosity formulation.

Formulation 2—Inventive:

Analogously to the preparation of formulation 1, formulation 2 was prepared from the inventive copolymer 5.

Formulation 3—Noninventive:

An emulsion according to formulation 1 was prepared with a commercial Siliconquat, Tegopren® 6924. Tegopren® 6924 is a linear siloxane with terminal modification by quat functions.

Formulation 4—Noninventive:

An emulsion of a commercial aminosiloxane (e.g. Biosoft from BioTex) was prepared with an active content of 20% by weight.

Formulation 5—Inventive:

Analogously to the preparation of formulation 1, formulation 5 was prepared from the inventive copolymer 6.

Formulation 6—Noninventive:

Tegopren® 7100, a commercial emulsion of a siloxane with pendant modification, the modification comprising polyether and amino functions alongside one another, was prepared with an active content of 20% by weight.

Application Examples

To test the hand achievable when the aminosiloxanes are used (tactile assessment) and also the achievable hydrophilicity, products consisting of native fibers were finished therewith by the following method:

Padding Method:

To examine the softness of the particular emulsions, knit cotton fabric (160 g/m$^2$) and terry cotton fabric (400 g/m$^2$) were padded with a liquor which contained in each case 20 g/l of the corresponding emulsion, then the textiles were squeezed down to a liquor pickup of approx. 100% by weight and dried at a temperature of 130° C. for three minutes.

To examine the hydrophilicity, woven cotton fabric (200 g/m$^2$) was padded with a liquor which contained in each case 30 g/l of the corresponding emulsion, and then squeezed off to a liquor pickup of approx. 100% by weight and dried at 130° C. for three minutes.

Test Methods:

Hand Assessment:

To assess the fabric hand, an experienced team was put together, which assessed the anonymized hand samples, the knit and terry fabrics finished with the emulsions, with the aid of a hand panel test. The hand samples of knit fabric were additionally supplemented with an inconspicuously labeled untreated sample.

Testing of Hydrophilicity:

To test the hydrophilicity, the test method based on DIN 53924 for measuring the height of rise of water was used. This involved cutting each finished cotton test fabric into five strips of length 25 cm and width 1.5 cm, marking the sides with a water-soluble pen and securing it to a holder in a taut perpendicular position, but without tension. The holder is subsequently placed into a water bath for 5 minutes such that 2 cm of the strips are immersed into the water. The water-soluble marking serves for better discernibility of the height of rise by the running of the ink when wetted with water. Once the holder has stood outside the water bath for 10 minutes, the height of rise in cm is read off and determined against the blank values (height of rise for the untreated cotton strips× cm=100%) and reported in % of the blank value.

Washing Operation:

The washing operations were conducted in a commercial Miele Novotronic W 918 washing machine, with color wash without prewash at 40° C., using IECA Base standard WFK laundry detergent and 3 kg of cotton ballast fabric. Finally, the woven fabric thus treated was dried at room temperature for 12 hours.

The test results for softness are shown in Tables 1 to 3, and those for hydrophilicity in Table 4.

TABLE 1

| Assessment of softness on knit cotton fabric after padding application | |
|---|---|
| Formulation 1 Inventive | +++ |
| Formulation 2 Inventive | ++ |
| Formulation 3 noninventive | +++ |
| Formulation 4 noninventive | +++ |
| Untreated | − |

+++ excellent,
++ very good,
+ good,
o satisfactory,
− poor

TABLE 2

Assessment of softness on terry cotton fabric after padding application

| | |
|---|---|
| Formulation 1 inventive | ++ |
| Formulation 2 inventive | +++ |
| Formulation 3 noninventive | ++ |
| Formulation 4 noninventive | ++ |
| Untreated | − |

+++ excellent,
++ very good,
+ good,
o satisfactory,
− poor

TABLE 3

Assessment of softness on knit cotton fabric after padding application

| | Before the wash | After the 1st wash | After the 3rd wash | After the 5th wash |
|---|---|---|---|---|
| Formulation 3 noninventive | ++ | ++ | o | o |
| Formulation 4 noninventive | +++ | +++ | +++ | ++ |
| Formulation 5 inventive | +++ | +++ | ++ | + |
| Formulation 6 noninventive | + | o | − | − |
| Untreated | o | − | − | − |

+++ excellent,
++ very good,
+ good,
o satisfactory,
− poor

TABLE 4

Assessment of water pickup of woven cotton fabric after padding application

| Woven fabric type of the treated cotton | Height of rise in % of the blank value |
|---|---|
| Formulation 1 - inventive | 84.3 |
| Formulation 2 - inventive | 82.6 |
| Formulation 3 - noninventive | 84.1 |
| Formulation 4 - noninventive | 30.3 |
| Formulation 5 - inventive | 81.9 |
| Formulation 6 - noninventive | 90.5 |
| Untreated | 100.0 |

The results in Table 4 show an excellent water pickup of the woven cotton fabrics treated with the inventive formulations of more than 80% of the height of rise of the untreated sample. The increased hydrophilicity of the inventive formulations is thus demonstrated, especially compared to the noninventive formulation 4. At the same time, the textile fabrics treated with the inventive formulations exhibit excellent softness combined with very good permanence (formulation 5 in Table 3). Excellent softness combined with good permanence can also be achieved with the noninventive formulation 4, but this exhibits exceptionally hydrophobic and hence undesired behaviour with regard to water pickup.

Table 4 additionally shows that the results for the noninventive formulations 3 and especially 6 with regard to water pickup are similar to those according to the invention, but the softness of knit cotton fabric is significantly poorer for these formulations, as can be inferred from Table 3.

Explanation:

The result is a soft, very fleecy and silky hand of the textile fabrics finished with the inventive products (formulations 1, 2 and 5), which is essentially maintained even after repeated washing (formulation 5). The inventive products exhibit excellent hand coupled with simultaneously excellent hydrophilicity compared to commercial products. Formulation 5 additionally shows, on smooth woven fabric (knit cotton fabric), a significantly improved permanence over 5 washes, which is reflected in a virtually constant good assessment of hand.

Household Care Compositions Comprising Novel Silicones and Methods of Using the Same.

The novel silicones of the present invention can be added to household care products in amounts of generally from 0.01% to 20%, alternatively from 0.05% to 10%, alternatively 0.1% to 5%, alternatively from 0.25% to 2.5%, alternatively combinations thereof, by weight of the of the overall composition.

Non-limiting examples of household care composition include: liquid laundry detergent compositions, solid laundry detergent compositions, hard surface cleaning compositions, liquid hand dishwashing compositions, solid automatic dishwashing compositions, liquid automatic dishwashing, tab/unit dose form automatic dishwashing compositions, tab/unit dose form laundry care compositions, dryer bar compositions, dryer sheet coat mix compositions, fabric spray compositions, air care compositions (e.g., air freshener), stain treatment composition, laundry detergent booster compositions, "single rinse" fabric softener compositions, "single rinse" fabric enhancer compositions.

In one embodiment, the household care compositions comprises from about 0.1% to about 50%, from about 0.5% to about 30%, from about 1% to about 20%, or combinations thereof, of a surfactant selected from the group consisting of anionic, cationic, amphoteric, nonionic surfactants, and combinations thereof.

In one embodiment, the household care composition is a laundry detergent or cleaning composition. Laundry detergents and cleaning compositions generally comprise surfactants and, if appropriate, cleaning polymers, builders and further customary ingredients, for example cobuilders, complexing agents, bleaches, standardizers, graying inhibitors, dye transfer inhibitors, enzymes and perfumes.

The novel linear polydimethylsiloxane-polyether copolymers with amino and/or quaternary ammonium groups of the present invention may be utilized in laundry detergents or cleaning compositions comprising a surfactant system comprising $C_{10}$-$C_{15}$ alkyl benzene sulfonates (LAS) and one or more co-surfactants selected from nonionic, cationic, anionic or mixtures thereof. The selection of co-surfactant may be dependent upon the desired benefit. In one embodiment, the co-surfactant is selected as a nonionic surfactant, preferably $C_{12}$-$C_{18}$ alkyl ethoxylates. In another embodiment, the co-surfactant is selected as an anionic surfactant, preferably $C_{10}$-$C_{18}$ alkyl alkoxy sulfates ($AE_xS$) wherein x is from 1-30. In another embodiment the co-surfactant is selected as a cationic surfactant, preferably dimethyl hydroxyethyl lauryl ammonium chloride. If the surfactant system comprises $C_{10}$-$C_{15}$ alkyl benzene sulfonates (LAS), the LAS is used at levels ranging from about 9% to about 25%, or from about 13% to about 25%, or from about 15% to about 23%, or combinations thereof, by weight of the composition.

The surfactant system may comprise from 0% to about 7%, or from about 0.1% to about 5%, or from about 1% to about 4%, or combinations thereof, by weight of the composition of a co-surfactant selected from a nonionic co-surfactant, cationic co-surfactant, anionic co-surfactant and any mixture thereof.

Non-limiting examples of nonionic co-surfactants include: $C_{12}$-$C_{18}$ alkyl ethoxylates, such as, NEODOL® nonionic surfactants from Shell; $C_6$-$C_{12}$ alkyl phenol alkoxylates wherein the alkoxylate units are a mixture of ethyleneoxy and propyleneoxy units; $C_{12}$-$C_{18}$ alcohol and $C_6$-$C_{12}$ alkyl phenol condensates with ethylene oxide/propylene oxide block alkyl polyamine ethoxylates such as PLURONIC® from BASF; $C_{14}$-$C_{22}$ mid-chain branched alcohols, BA, as discussed in U.S. Pat. No. 6,150,322; $C_{14}$-$C_{22}$ mid-chain branched alkyl alkoxylates, $BAE_x$, wherein x is from 1-30, as discussed in U.S. Pat. No. 6,153,577, U.S. Pat. No. 6,020,303 and U.S. Pat. No. 6,093,856; alkylpolysaccharides as discussed in U.S. Pat. No. 4,565,647 Llenado, issued Jan. 26, 1986; specifically alkylpolyglycosides as discussed in U.S. Pat. No. 4,483,780 and U.S. Pat. No. 4,483,779; polyhydroxy fatty acid amides as discussed in U.S. Pat. No. 5,332,528; and ether capped poly(oxyalkylated) alcohol surfactants as discussed in U.S. Pat. No. 6,482,994 and WO 01/42408.

Non-limiting examples of semi-polar nonionic co-surfactants include: water-soluble amine oxides containing one alkyl moiety of from about 10 to about 18 carbon atoms and 2 moieties selected from the group consisting of alkyl moieties and hydroxyalkyl moieties containing from about 1 to about 3 carbon atoms; water-soluble phosphine oxides containing one alkyl moiety of from about 10 to about 18 carbon atoms and 2 moieties selected from the group consisting of alkyl moieties and hydroxyalkyl moieties containing from about 1 to about 3 carbon atoms; and water-soluble sulfoxides containing one alkyl moiety of from about 10 to about 18 carbon atoms and a moiety selected from the group consisting of alkyl moieties and hydroxyalkyl moieties of from about 1 to about 3 carbon atoms. See WO 01/32816, U.S. Pat. No. 4,681,704, and U.S. Pat. No. 4,133,779.

Non-limiting examples of cationic co-surfactants include: the quaternary ammonium surfactants, which can have up to 26 carbon atoms include: alkoxylate quaternary ammonium (AQA) surfactants as discussed in U.S. Pat. No. 6,136,769; dimethyl hydroxyethyl quaternary ammonium as discussed in U.S. Pat. No. 6,004,922; dimethyl hydroxyethyl lauryl ammonium chloride; polyamine cationic surfactants as discussed in WO 98/35002, WO 98/35003, WO 98/35004, WO 98/35005, and WO 98/35006; cationic ester surfactants as discussed in U.S. Pat. Nos. 4,228,042, 4,239,660 4,260,529 and U.S. Pat. No. 6,022,844; and amino surfactants as discussed in U.S. Pat. No. 6,221,825 and WO 00/47708, specifically amido propyldimethyl amine (APA).

Non-limiting examples of anionic co-surfactants useful herein include: $C_{10}$-$C_{20}$ primary, branched chain and random alkyl sulfates (AS); $C_{10}$-$C_{18}$ secondary (2,3) alkyl sulfates; $C_{10}$-$C_{18}$ alkyl alkoxy sulfates $(AE_xS)$ wherein x is from 1-30; $C_{10}$-$C_{18}$ alkyl alkoxy carboxylates comprising 1-5 ethoxy units; mid-chain branched alkyl sulfates as discussed in U.S. Pat. No. 6,020,303 and U.S. Pat. No. 6,060,443; mid-chain branched alkyl alkoxy sulfates as discussed in U.S. Pat. No. 6,008,181 and U.S. Pat. No. 6,020,303; modified alkylbenzene sulfonate (MLAS) as discussed in WO 99/05243, WO 99/05242 and WO 99/05244; methyl ester sulfonate (MES); and alpha-olefin sulfonate (AOS).

The present invention may also relate to household care compositions comprising the novel silicones of the present invention and a surfactant system comprising $C_8$-$C_{18}$ linear alkyl sulphonate surfactant and a co-surfactant. The compositions can be in any form, namely, in the form of a liquid; a solid such as a powder, granules, agglomerate, paste, tablet, pouches, bar, gel; an emulsion; types delivered in dual-compartment containers; a spray or foam detergent; premoistened wipes (i.e., the cleaning composition in combination with a nonwoven material such as that discussed in U.S. Pat. No. 6,121,165, Mackey, et al.); dry wipes (i.e., the cleaning composition in combination with a nonwoven materials, such as that discussed in U.S. Pat. No. 5,980,931, Fowler, et al.) activated with water by a consumer; and other homogeneous or multiphase consumer cleaning product forms.

In one aspect of the invention the household care composition is a fabric treatment composition which may comprise from about 0.01% to about 10%, from about 0.05 to about 5%, or from about 0.15 to about 3%, or alternatives thereof, of a deposition aid. Suitable deposition aids are disclosed in, for example, US 2008-0242584 A1.

In one aspect, the deposition aid may be a cationic or amphoteric polymer. In another aspect, the deposition aid may be a cationic polymer. Non-limiting examples include those in U.S. Pat. No. 6,492,322 at col. 6, l. 65 et seq. In one aspect, the cationic polymer may have a cationic charge density of from about 0.005 to about 23, from about 0.01 to about 12, or from about 0.1 to about 7 milliequivalents/g, at the pH of intended use of the composition. For amine-containing polymers, wherein the charge density depends on the pH of the composition, charge density is measured at the intended use pH of the product. Such pH will generally range from about 2 to about 11, more generally from about 2.5 to about 9.5. Charge density is calculated by dividing the number of net charges per repeating unit by the molecular weight of the repeating unit. The positive charges may be located on the backbone of the polymers and/or the side chains of polymers.

One group of suitable cationic polymers includes those produced by polymerization of ethylenically unsaturated monomers using a suitable initiator or catalyst, such as those disclosed in WO 00/56849 and U.S. Pat. No. 6,642,200. Suitable polymers may be selected from the group consisting of cationic or amphoteric polysaccharide, polyethylene imine and its derivatives, and a synthetic polymer made by polymerizing one or more cationic monomers selected from the group consisting of N,N-dialkylaminoalkyl acrylate, N,N-dialkylaminoalkyl methacrylate, N,N-dialkylaminoalkyl acrylamide, N,N-dialkylaminoalkylmethacrylamide, quaternized N,N dialkylaminoalkyl acrylate quaternized N,N-dialkylaminoalkyl methacrylate, quaternized N,N-dialkylaminoalkyl acrylamide, quaternized N,N-dialkylaminoalkylmethacrylamide, Methacryloamidopropyl-pentamethyl-1,3-propylene-2-ol-ammonium dichloride, N,N,N,N,N',N",N"'-heptamethyl-N"-3-(1-oxo-2-methyl-2-propenyl)aminopropyl-9-oxo-8-azo-decane-1,4,10-triammonium trichloride, vinylamine and its derivatives, allylamine and its derivatives, vinyl imidazole, quaternized vinyl imidazole and diallyl dialkyl ammonium chloride and combinations thereof, and optionally a second monomer selected from the group consisting of acrylamide, N,N-dialkyl acrylamide, methacrylamide, N,N-dialkylmethacrylamide, C1-C12 alkyl acrylate, C1-C12 hydroxyalkyl acrylate, polyalkylene glyol acrylate, C1-C12 alkyl methacrylate, C1-C12 hydroxyalkyl methacrylate, polyalkylene glycol methacrylate, vinyl acetate, vinyl alcohol, vinyl formamide, vinyl acetamide, vinyl alkyl ether, vinyl pyridine, vinyl pyrrolidone, vinyl imidazole, vinyl caprolactam, and derivatives, acrylic acid, methacrylic acid, maleic acid, vinyl sulfonic acid, styrene sulfonic acid, acrylamidopropylmethane sulfonic acid (AMPS) and their salts. The polymer may optionally be branched or cross-linked by using branching and crosslinking monomers. Branching and crosslinking monomers include ethylene glycoldiacrylate divinylbenzene, and butadiene. A suitable polyethyleneinine useful herein is that sold under the tradename Lupasol® by BASF, AG, Ludwigschaefen, Germany In another aspect, the treatment composition may comprise an amphoteric deposition aid polymer so long as the polymer possesses a net positive charge. Said polymer may have a cationic charge density of about 0.05 to about 18 milliequivalents/g. In another aspect, the deposition aid may be selected from the group consisting of cationic polysaccharide, polyethylene imine and its derivatives, poly(acrylamide-co-diallyldimethylammonium chloride), poly(acrylamide-methacrylamidopropyltrimethyl ammonium chloride), poly(acrylamide-co-N,N-dimethyl aminoethyl acrylate) and its quaternized derivatives, poly(acrylamide-co-N,N-dimethyl aminoethyl methacrylate) and its quaternized derivative, poly(hydroxyethylacrylate-co-dimethyl aminoethyl methacrylate), poly(hydroxpropylacrylate-co-dimethyl aminoethyl methacrylate), poly(hydroxpropylacrylate-co-methacrylamidopropyltrimethylammonium chloride), poly(acrylamide-co-diallyldimethylammonium chloride-co-acrylic acid), poly(acrylamide-methacrylamidopropyltrimethyl ammonium chloride-co-acrylic acid), poly(diallyldimethyl ammonium chloride), poly(vinylpyrrolidone-co-dimethylaminoethyl methacrylate), poly(ethyl methacrylate-co-quaternized dimethylaminoethyl methacrylate), poly(ethyl methacrylate-co-oleyl methacrylate-co-diethylaminoethyl methacrylate), poly(diallyldimethylammonium chloride-co-acrylic acid), poly(vinyl pyrrolidone-co-quaternized vinyl imidazole) and poly(acrylamide-co-Methacryloamidopropyl-pentamethyl-1,3-propylene-2-ol-ammonium dichloride), Suitable deposition aids include Polyquaternium-1, Polyquaternium-5, Polyquaternium-6, Polyquaternium-7, Polyquaternium-8, Polyquaternium-11, Polyquaternium-14, Polyquaternium-22, Polyquaternium-28, Polyquaternium-30, Polyquaternium-32 and Polyquaternium-33, as named under the International Nomenclature for Cosmetic Ingredients.

In one aspect, the deposition aid may comprise polyethyleneimine or a polyethyleneimine derivative. In another aspect, the deposition aid may comprise a cationic acrylic based polymer. In a further aspect, the deposition aid may comprise a cationic polyacrylamide. In another aspect, the deposition aid may comprise a polymer comprising polyacrylamide and polymethacrylamidoproply trimethylammonium cation. In another aspect, the deposition aid may comprise poly(acrylamide-N-dimethyl aminoethyl acrylate) and its quaternized derivatives. In this aspect, the deposition aid may be that sold under the tradename Sedipur®, available from BTC Specialty Chemicals, a BASF Group, Florham Park, N.J. In a yet further aspect, the deposition aid may comprise poly(acrylamide-co-methacrylamidopropyltrimethyl ammonium chloride). In another aspect, the deposition aid may comprise a non-acrylamide based polymer, such as that sold under the tradename Rheovis® CDE, available from Ciba Specialty Chemicals, a BASF group, Florham Park, N.J., or as disclosed in USPA 2006/0252668.

In another aspect, the deposition aid may be selected from the group consisting of cationic or amphoteric polysaccharides. In one aspect, the deposition aid may be selected from the group consisting of cationic and amphoteric cellulose ethers, cationic or amphoteric galactomanan, cationic guar gum, cationic or amphoteric starch, and combinations thereof. Another group of suitable cationic polymers may include alkylamine-epichlorohydrin polymers which are reaction products of amines and oligoamines with epicholorohydrin, for example, those polymers listed in, for example, U.S. Pat. Nos. 6,642,200 and 6,551,986. Examples include dimethylamine-epichlorohydrin-ethylenediamine, available under the trade name Cartafix® CB and Cartafix® TSF from Clariant, Basle, Switzerland.

Another group of suitable synthetic cationic polymers may include polyamidoamine-epichlorohydrin (PAE) resins of polyalkylenepolyamine with polycarboxylic acid. The most common PAE resins are the condensation products of diethylenetriamine with adipic acid followed by a subsequent reaction with epichlorohydrin. They are available from Hercules Inc. of Wilmington Del. under the trade name Kymene™ or from BASF AG (Ludwigshafen, Germany) under the trade name Luresin™. These polymers are described in Wet Strength resins and their applications edited by L. L. Chan, TAPPI Press (1994).

The cationic polymers may contain charge neutralizing anions such that the overall polymer is neutral under ambient conditions. Non-limiting examples of suitable counter ions (in addition to anionic species generated during use) include chloride, bromide, sulfate, methylsulfate, sulfonate, methylsulfonate, carbonate, bicarbonate, formate, acetate, citrate, nitrate, and mixtures thereof.

The weight-average molecular weight of the polymer may be from about 500 to about 5,000,000, or from about 1,000 to about 2,000,000, or from about 2,500 to about 1,500,000 Daltons, as determined by size exclusion chromatography relative to polyethyleneoxide standards with RI detection. In one aspect, the MW of the cationic polymer may be from about 500 to about 37,500 Daltons.

In one embodiment, the cleaning composition of the present invention is a liquid or solid laundry detergent composition. In another embodiment, the cleaning composition of the present invention is a hard surface cleaning composition, preferably wherein the hard surface cleaning composition impregnates a nonwoven substrate. As used herein "impregnate" means that the hard surface cleaning composition is placed in contact with a nonwoven substrate such that at least a portion of the nonwoven substrate is penetrated by the hard surface cleaning composition, preferably the hard surface cleaning composition saturates the nonwoven substrate. The cleaning composition may also be utilized in car care compositions, for cleaning various surfaces such as hard wood, tile, ceramic, plastic, leather, metal, glass. This cleaning composition could be also designed to be used in a personal care and pet care compositions such as shampoo composition, body wash, liquid or solid soap and other cleaning composition in which surfactant comes into contact with free hardness and in all compositions that require hardness tolerant surfactant system, such as oil drilling compositions.

In another embodiment the cleaning composition is a dish cleaning composition, such as liquid hand dishwashing compositions, solid automatic dishwashing compositions, liquid automatic dishwashing compositions, and tab/unit does forms of automatic dishwashing compositions.

Quite typically, cleaning compositions herein such as laundry detergents, laundry detergent additives, hard surface cleaners, synthetic and soap-based laundry bars, fabric softeners and fabric treatment liquids, solids and treatment articles of all kinds will require several adjuncts, though certain simply formulated products, such as bleach additives, may require only, for example, an oxygen bleaching agent and a surfactant as described herein. A comprehensive list of suitable laundry or cleaning adjunct materials can be found in WO 99/05242.

Common cleaning adjuncts include builders, enzymes, polymers not discussed above, bleaches, bleach activators, catalytic materials and the like excluding any materials already defined hereinabove. Other cleaning adjuncts herein can include suds boosters, suds suppressors (antifoams) and the like, diverse active ingredients or specialized materials such as dispersant polymers (e.g., from BASF Corp. or Rohm & Haas) other than those described above, color speckles, silvercare, anti-tarnish and/or anti-corrosion agents, dyes, fillers, germicides, alkalinity sources, hydrotropes, anti-oxidants, enzyme stabilizing agents, pro-perfumes, perfumes, solubilizing agents, carriers, processing aids, pigments, and, for liquid formulations, solvents, chelating agents, dye transfer inhibiting agents, dispersants, brighteners, suds suppressors, dyes, structure elasticizing agents, fabric softeners, anti-abrasion agents, hydrotropes, processing aids, and other fabric care agents, surface and skin care agents. Suitable examples of such other cleaning adjuncts and levels of use are found in U.S. Pat. Nos. 5,576,282, 6,306,812 B1 and 6,326, 348 B1.

In one embodiment the household care composition is a fabric care composition which comprises an adjunct selected from the group consisting of delivery enhancing agents, fluorescent whitening agents, enzymes, rheology modifiers, builders, and mixtures thereof. In yet another embodiment, the composition comprises a deliver enhancing agent.

Method of Use

The present invention includes a method for cleaning a targeted surface. As used herein "targeted surface" may include such surfaces such as fabric, dishes, glasses, and other cooking surfaces, hard surfaces, hair, or skin. As used herein "hard surface" includes hard surfaces being found in a typical home such as hard wood, tile, ceramic, plastic, leather, metal, glass. Such method includes the steps of contacting the composition comprising the novel silicones or the present invention, in neat form or diluted in wash liquor, with at least a portion of a targeted surface then optionally rinsing the targeted surface. Preferably the targeted surface is subjected to a washing step prior to the aforementioned optional rinsing step. For purposes of the present invention, washing includes, but is not limited to, scrubbing, wiping and mechanical agitation.

As will be appreciated by one skilled in the art, the cleaning compositions of the present invention are ideally suited for use in home care (hard surface cleaning compositions) and/or laundry applications.

The composition solution pH is chosen to be the most complimentary to a target surface to be cleaned spanning broad range of pH, from about 5 to about 11. For personal care such as skin and hair cleaning pH of such composition preferably has a pH from about 5 to about 8 for laundry cleaning compositions pH of from about 8 to about 10. The compositions are preferably employed at concentrations of from about 200 ppm to about 10,000 ppm in solution. The water temperatures preferably range from about 5° C. to about 100° C.

For use in laundry cleaning compositions, the compositions are preferably employed at concentrations from about 200 ppm to about 10000 ppm in solution (or wash liquor). The water temperatures preferably range from about 5° C. to about 60° C. The water to fabric ratio is preferably from about 1:1 to about 20:1.

The method may include the step of contacting a nonwoven substrate impregnated with an embodiment of the composition of the present invention. As used herein "nonwoven substrate" can comprise any conventionally fashioned nonwoven sheet or web having suitable basis weight, caliper (thickness), absorbency and strength characteristics. Examples of suitable commercially available nonwoven substrates include those marketed under the tradename SONTARA® by DuPont and POLYWEB® by James River Corp.

As will be appreciated by one skilled in the art, the cleaning compositions of the present invention may be suited for use in liquid dish cleaning compositions. The method for using a liquid dish composition of the present invention comprises the steps of contacting soiled dishes with an effective amount, typically from about 0.5 ml. to about 20 ml. (per 25 dishes being treated) of the liquid dish cleaning composition of the present invention diluted in water.

In one embodiment, the household care composition is an air care composition (e.g., air freshener). Examples may include: U.S. Pat. Nos. 6,482,358; 6,279,834; 6,592,813; 5,143,288; 5,939,060; 5,783,544; 6,077,318; 2007-0281877; U.S. Pat. Nos. 7,262,159; 7,223,361; 2002/0066798; U.S. Pat. Nos. 6,790,408; 2008/0191370; 2002/6487367; U.S. Pat. No. 6,361,752.

Fabric Enhancer Compositions:

In one embodiment, the household care composition is a fabric enhancer composition. Non-limiting examples of fabric enhancer products include liquid fabric softeners marketed under the brand name DOWNY that are typically administered during the rinse cycle of a washing machine. Another example includes dryer sheets that are added to a clothing dryer (e.g., marketed under the brand name BOUNCE). Another example of a dryer added article includes the BOUNCE Dryer Bar. Fabric sprays include DOWNY WRINKLE RELEASER.

In one aspect of the invention, the silicones of the present invention may be combined with fabric softener actives. One class of fabric softener actives includes cationic surfactants. Examples of cationic surfactants include quaternary ammonium compounds. Exemplary quaternary ammonium compounds include alkylated quaternary ammonium compounds, ring or cyclic quaternary ammonium compounds, aromatic quaternary ammonium compounds, diquaternary ammonium compounds, alkoxylated quaternary ammonium compounds, amidoamine quaternary ammonium compounds, ester quaternary ammonium compounds, and mixtures thereof. A final fabric softening composition (suitable for retail sale) will comprise from about 1% to about 30%, alternatively from about 10% to about 25%, alternatively from about 15 to about 20%, alternatively from about 0.1% to about 5%, alternatively combinations thereof, of fabric softening active by weight of the final composition. Fabric softening compositions, and components thereof, are generally described in US 2004/0204337. In one embodiment, the fabric softening composition is a so called rinse added composition. In such embodiment, the composition is substantially free of detersive surfactants, alternatively substantially free of anionic surfactants. In another embodiment, the pH of the fabric softening composition is acidic, for example between pH 2 and 4. In yet another embodiment, the fabric softening active is DEEDMAC (e.g., ditallowoyl ethanolester dimethyl ammonium chloride). DEEDMAC means mono and di-fatty acid ethanol ester dimethyl ammonium quaternaries, the reaction products of straight chain fatty acids, methyl esters and/or triglycerides (e.g., from animal and/or vegetable fats and oils such as tallow, palm oil and the like) and methyl diethanol amine to form the mono and di-ester compounds followed by quaternization with an aklyating agent. See U.S. Pat. Nos. 4,767,547; 5,460,736; 5,474,690; 5,545,340; 5,545, 350; 5,562,849. A suitable supplier of fabric softening active may include Evonik Degussa Corporation.

Adjunct ingredients that may be added to the fabric enhancer compositions of the present invention. The ingredients may include: suds suppressor, preferably a silicone suds suppressor (US 2003/0060390 A1, ¶65-77)1 cationic starches (U.S. Pat. No. 7,135,451; U.S. Pat. No. 7,625,857); scum dispersants (US 2003/0126282 A1, ¶89-90); perfume and perfume microcapsules (U.S. Pat. No. 5,137,646); nonionic surfactant, non-aqueous solvent, fatty acid, dye, preservatives, optical brighteners, antifoam agents, and combinations thereof. Other adjunct ingredients may include: dispersing agent, stabilizer, pH control agent, metal ion control agent, colorant, brightener, dye, odor control agent, pro-perfume, cyclodextrin, solvent, soil release polymer, preservative, anti-microbial agent, chlorine scavenger, enzyme, anti-shrinkage agent, fabric crisping agent, spotting agent, anti-oxidant, anti-corrosion agent, bodying agent, drape and form control agent, smoothness agent, static control agent, wrinkle control agent, sanitization agent, disinfecting agent, germ control agent, mold control agent, mildew control agent, antiviral agent, anti-microbial, drying agent, stain resistance agent, soil release agent, malodor control agent, fabric refreshing agent, chlorine bleach odor control agent, dye fixative, dye transfer inhibitor, color maintenance agent, color restoration/rejuvenation agent, anti-fading agent, whiteness enhancer, anti-abrasion agent, wear resistance agent, fabric integrity agent, anti-wear agent, and rinse aid, UV protection agent, sun fade inhibitor, insect repellent, anti-allergenic agent, enzyme, flame retardant, water proofing agent, fabric comfort agent, water conditioning agent, shrinkage resistance agent, stretch resistance agent, enzymes, cationic starch, and combinations thereof. In one embodiment, the composition comprises one or more adjunct ingredient up to about 2% by weight of the composition. In yet another embodiment, the composition of the present invention may be free or essentially free of any one or more adjunct ingredients. In yet another embodiment, the composition is free or essentially free of detersive surfactants.

In one embodiment, the perfume of the household care composition comprises a perfume microcapsule. The encapsulate perfumes of the present invention are encapsulated in a shell to form a perfume microcapsule. Suitable perfume microcapsules may include those described in the following references: US 2003-215417 A1; US 2003-216488 A1; US 2003-158344 A1; US 2003-165692 A1; US 2004-071742 A1; US 2004-071746 A1; US 2004-072719 A1; US 2004-072720 A1; EP 1393706 A1; US 2003-203829 A1; US 2003-195133 A1; US 2004-087477 A1; US 2004-0106536 A1; US 2008-0305982 A1; US 2009-0247449 A1; U.S. Pat. No. 6,645,479; U.S. Pat. No. 6,200,949; U.S. Pat. No. 5,145,842; U.S. Pat. No. 4,882,220; U.S. Pat. No. 4,917,920; U.S. Pat. No. 4,514,461; U.S. Pat. No. 4,234,627; U.S. Pat. No. 4,081,384; US RE 32713; U.S. Pat. No. 4,234,627; U.S. Pat. No. 7,119,057. In another embodiment, the perfume microcapsule comprises a friable microcapsule. In another embodiment, the shell comprising an aminoplast copolymer, especially melamine-formaldehyde or urea-formaldehyde or cross-linked melamine formaldehyde or the like. Capsules may be obtained from Appleton Papers Inc., of Appleton, Wis. USA.

In one embodiment, the pH of the fabric enhancer composition may comprise a pH of from about 2 to about 5, preferably from about 2 to about 4.5, and more preferably from about 2.5 to about 4. In another embodiment, the composition comprises a neutral pH, alternatively from about 5 to about 9, alternatively from 5.1 to about 6, alternatively from about 6 to about 8, alternatively from about 7, alternatively combinations thereof.

In one aspect of the invention, a method of treating a fabric with a fabric enhancer composition is provided. In another embodiment, the method comprises the step of administering a composition of the present invention to a rinse cycle of an automatic laundry machine or a hand washing laundry rinse basin. The term "administering" means causing the composition to be delivered to a rinse bath solution. Examples of administering include, for example, dispensing the composition in an automatic fabric softener dispenser that is integral to the laundry washing machine whereby the dispenser dispenses the composition at the appropriate time during the laundry washing process, e.g., last rinse cycle. Another example is dispensing the composition in a device, such a DOWNY BALL, wherein the device will dispense the composition at the appropriate time during the laundry washing process. In another embodiment, a composition of the present invention is dosed in a first rinse bath solution or a dosed in a single rinse bath solution. This is particularly convenient in a hand washing context. See e.g., U.S. Pat. Appl. No. 2003-0060390 A1. An example of a single rinse product includes DOWNY Single Rinse.

On embodiment provides for a fabric enhancer composition comprising: a linear polydimethylsiloxane-polyether copolymer within amino and/or quaternary ammonium group of the present invention; a cationic surfactant suitable for softening fabric; optionally a perfume; optionally comprising a pH from 2 to 4.

Another aspect of the invention provides for a dryer bar composition. Non-limiting examples of such compositions and articles are described in U.S. Pat. Nos. 6,779,740; 6,883,723; 6,899,281; 6,908,041; 6,910,640; 6,910,641; 7,055,761; 7,087,572; 7,093,772; 7,250,393; 7,309,026; 7,381,697; 7,452,855; 7,456,145.

Another aspect of the invention provides for a dryer sheet coat mix composition. Non-limiting example of such compositions and dryer sheet articles are described in U.S. Pat. Nos. 5,929,026; 5,883,069; 5,574,179; 5,562,849; 5,545,350; 5,545,340; 5,476,599; 5,470,492; 4,981,239; 4,767,547;

Another aspect of the invention provides for a fabric spray composition, Non-limiting example of such compositions and articles are described in U.S. Pat. Nos. 5,798,107; 6,001,343; 6,491,840; 6,495,058; 6,573,233." Method of treating fabric comprises the step of spraying a composition with a fabric spray composition.

Another aspect of the invention provides for a tab/unit dose containing the novel silicones of the present invention suitable for treating laundry. The unit dose may be in the form of a water soluble film encompassing a composition of the present invention. The unit dose may be administered to a laundry washing machine. Such unit doses may be described in U.S. Pat. No. 7,186,680.

Clear or Translucent Compositions:

Without wishing to be bound by theory, the use of the silicones of the present invention may contribute to achieving household care compositions that are clear or translucent. In one embodiment, such compositions which comprise these silicones have a percent transmittance of greater than about 30, or greater than 40, or greater than 50, or greater than 60, or combinations thereof, at 570 nanometers measured in the absence of dyes (using a 1 cm cuvette). A suitable technique may be described in U.S. Pat. No. 6,949,498, at col. 5, line 51 to col. 6, 1. 3. In one embodiment, the composition is essentially free of substantially insoluble matter.

Mitigating the Need for Structurants/Rheology Modifiers:

Without wishing to be bound by theory, the silicones of the present invention may have structurant and/or rheology modifier properties. As such, the use of these silicones in compositions may diminish the need for such structurants/rheology modifiers (thereby saving in formulations costs. In one embodiment, the household composition comprises less than 1%, alternatively less than 0.5%, alternatively less than 0.25%, alternatively less than 0.1%, alternatively less than 0.01%, alternatively substantially free or free of structurants/rheology modifiers by weight of the composition.

Providing Perfume Compatibility:

Without wishing to be bound by theory, the silicones of the invention may inhibit household compositions, with specific mention to fabric enhancer (e.g., fabric softening) compositions from "yellowing" (or other such undesirable color) that is typically associated with certain aldehedic or ketonic perfume. In other words, the use of the silicones may provide compatibility with these otherwise problematic perfume ingredients in fabric softening compositions. In one embodiment, the household compositions comprising the silicones of the present invention will comprises from about 0.001% to about 2% of aldehedic or ketonic containing perfume ingredients by weight of the household care composition. Alternative embodiments include, 0.01% to 1.5%, 0.1% to 1%, 0.5% to 3%, or combinations thereof, of the aldehedic or ketonic containing perfume ingredients by weight of the household care composition.

EXAMPLE 1

Liquid Detergent Fabric Care Compositions: Liquid detergent fabric care composition 1A was made by mixing together the ingredients listed in the proportions shown and compositions 1B-1E are made by mixing together the ingredients listed in the proportions shown:

| Ingredient (wt %) | 1A | 1B | 1C | 1D | 1E |
| --- | --- | --- | --- | --- | --- |
| C12-15 alkyl polyethoxylate (1.8) sulfate[1] | 20.1 | 16.6 | 14.7 | 13.9 | 8.2 |
| C11.8 linear alkylbenzene sulfonc acid[2] | — | 4.9 | 4.3 | 4.1 | 8.2 |
| C16-17 branched alkyl sulfate[1] | — | 2.0 | 1.8 | 1.6 | — |
| C12 alkyl trimethyl ammonium chloride[4] | 2.0 | | — | — | — |
| C12 alkyl dimethyl amine oxide[5] | | 0.7 | 0.6 | — | — |
| C12-14 alcohol 9 ethoxylate[3] | 0.3 | 0.8 | 0.9 | 0.6 | 0.7 |
| C15-16 branched alcohol-7 ethoxylate[1] | — | — | — | — | 4.6 |
| 1,2 Propane diol[6] | 4.5 | 4.0 | 3.9 | 3.1 | 2.3 |
| Ethanol | 3.4 | 2.3 | 2.0 | 1.9 | 1.2 |
| $C_{12-18}$ Fatty Acid[5] | 2.1 | 1.7 | 1.5 | 1.4 | 3.2 |
| Citric acid[7] | 3.4 | 3.2 | 3.5 | 2.7 | 3.9 |
| Protease[7] (32 g/L) | 0.42 | 1.3 | 0.07 | 0.5 | 1.12 |
| Fluorescent Whitening Agent[8] | 0.08 | 0.2 | 0.2 | 0.17 | 0.18 |
| Diethylenetriamine pentaacetic acid[6] | 0.5 | 0.3 | 0.3 | 0.3 | 0.2 |
| Ethoxylated polyamine[9] | 0.7 | 1.8 | 1.5 | 2.0 | 1.9 |
| Grease Cleaning Alkoxylated Polyalkylenimine Polymer[10] | — | — | 1.3 | 1.8 | — |
| Zwitterionic ethoxylated quaternized sulfated hexamethylene diamine[11] | — | 1.5 | — | — | 0.8 |
| Hydrogenated castor oil[12] | 0.2 | 0.2 | | 0.12 | 0.3 |
| Copolymer of acrylamide and methacrylamidopropyl trimethylammonium chloride[13] | 0.3 | 0.2 | 0.3 | 0.1 | 0.3 |
| Novel polydimethylsiloxane-polyether copolymers of Copolymer 1-6 (mixtures thereof may also be used) | 6.0 | 6.0 | 3.0 | 0.5 | 3.0 |
| Water, perfumes, dyes, buffers, solvents and other optional components | to 100% pH 8.0-8.2 | to 100% pH 8.0-8.2 | to 100% pH 8.0-8.2 | to 100% pH 8.0-8.2 | to 100% pH 8.0-8.2 |

EXAMPLE 2

Liquid or Gel Detergents: Liquid or gel detergent fabric care compositions are prepared by mixing the ingredients listed in the proportions shown:

| Ingredient (wt %) | 2A | 2B | 2C | 2D | 2E |
|---|---|---|---|---|---|
| C12-15 alkyl polyethoxylate (3.0) sulfate[1] | 8.5 | 2.9 | 2.9 | 2.9 | 6.8 |
| C11.8 linear alkylbenzene sulfonic acid[2] | 11.4 | 8.2 | 8.2 | 8.2 | 1.2 |
| C14-15 alkyl 7-ethoxylate[1] | — | 5.4 | 5.4 | 5.4 | 3.0 |
| C12-14 alkyl 7-ethoxylate[3] | 7.6 | — | — | — | 1.0 |
| 1,2 Propane diol | 6.0 | 1.3 | 1.3 | 6.0 | 0.2 |
| Ethanol | — | 1.3 | 1.3 | — | 1.4 |
| Di Ethylene Glycol | 4.0 | — | — | — | — |
| Na Cumene Sulfonate | — | 1.0 | 1.0 | 0.9 | — |
| $C_{12-18}$ Fatty Acid[5] | 9.5 | 3.5 | 3.5 | 3.5 | 4.5 |
| Citric acid | 2.8 | 3.4 | 3.4 | 3.4 | 2.4 |
| Protease (40.6 mg/g/)[7] | 1.0 | 0.6 | 0.6 | 0.6 | 0.3 |
| Natalase 200L (29.26 mg/g)[14] | — | 0.1 | 0.1 | 0.1 | — |
| Termamyl Ultra (25.1 mg/g)[14] | 0.7 | 0.1 | 0.1 | 0.1 | 0.1 |
| Mannaway 25L (25 mg/g)[14] | 0.1 | 0.1 | 0.1 | 0.1 | 0.02 |
| Whitezyme (20 mg/g)[14] | 0.2 | 0.1 | 0.1 | 0.1 | — |
| Fluorescent Whitening Agent[8] | 0.2 | 0.1 | 0.1 | 0.1 | — |
| Diethylene Triamine Penta Methylene Phosphonic acid | — | 0.3 | 0.3 | 0.3 | 0.1 |
| Hydroxy Ethylidene 1,1 Di Phosphonic acid | 1.5 | — | — | — | — |
| Zwitterionic ethoxylated quaternized sulfated hexamethylene diamine[11] | 2.1 | 1.0 | 1.0 | 1.0 | 0.7 |
| Grease Cleaning Alkoxylated Polyalkylenimine Polymer[10] | — | 0.4 | 0.4 | 0.4 | — |
| PEG-PVAc Polymer[15] | 0.9 | 0.5 | 0.5 | 0.5 | — |
| Hydrogenated castor oil[12] | 0.8 | 0.4 | 0.4 | 0.4 | 0.3 |
| Terpolymer of acrylamide, acrylic acid and methacrylamidopropyl trimethylammonium chloride[13] | — | 0.2 | 0.2 | 0.2 | 0.2 |
| Borate | — | 1.3 | — | — | 1.2 |
| 4 Formyl Phenyl Boronic Acid | — | — | 0.025 | — | — |
| Novel polydimethylsiloxane-polyether copolymers of Copolymer 1-6 (mixtures thereof may also be used) | 3.0 | 4.5 | 2.0 | 3.0 | 4.5 |
| Water, perfumes, dyes, buffers, neutralizers, stabilizers and other optional components | to 100% pH 8.0-8.2 | to 100% pH 8.0-8.2 | to 100% pH 8.0-8.2 | to 100% pH 8.0-8.2 | to 100% pH 8.0-8.2 |

[1]Available from Shell Chemicals, Houston, TX.
[2]Available from Huntsman Chemicals, Salt Lake City, UT.
[3]Available from Sasol Chemicals, Johannesburg, South Africa
[4]Available from Evonik Corporation, Hopewell, VA.
[5]Available from The Procter & Gamble Company, Cincinnati, OH.
[6]Available from Sigma Aldrich chemicals, Milwaukee, WI
[7]Available from Genencor International, South San Francisco, CA.
[8]Available from Ciba Specialty Chemicals, High Point, NC
[9]600 g/mol molecular weight polyethylenimine core with 20 ethoxylate groups per —NH and available from BASF (Ludwigshafen, Germany)
[10]600 g/mol molecular weight polyethylenimine core with 24 ethoxylate groups per —NH and 16 propoxylate groups per —NH. Available from BASF (Ludwigshafen, Germany).
[11]Described in WO 01/05874 and available from BASF (Ludwigshafen, Germany)
[12]Available under the tradename ThixinR from Elementis Specialties, Highstown, NJ
[13]Available from Nalco Chemicals, Naperville, IL.
[14]Available from Novozymes, Copenhagen, Denmark.
[15]PEG-PVA graft copolymer is a polyvinyl acetate grafted polyethylene oxide copolymer having a polyethylene oxide backbone and multiple polyvinyl acetate side chains. The molecular weight of the polyethylene oxide backbone is about 6000 and the weight ratio of the polyethylene oxide to polyvinyl acetate is about 40 to 60 and no more than 1 grafting point per 50 ethylene oxide units. Available from BASF (Ludwigshafen, Germany).

EXAMPLE 3

Rinse-Added Fabric Care Compositions: Rinse-Added fabric care compositions are prepared by mixing together ingredients shown below:

| Ingredient | 3A | 3B | 3C | 3D |
|---|---|---|---|---|
| Fabric Softener Active[1] | 16.2 | 11.0 | 16.2 | — |
| Fabric Softener Active[2] | — | — | — | 5.0 |
| Cationic Starch[3] | 1.5 | — | 1.5 | — |
| Polyethylene imine[4] | 0.25 | 0.25 | — | — |
| Quaternized polyacrylamide[5] | — | — | 0.25 | 0.25 |
| Calcium chloride | 0.15 | 0. | 0.15 | — |
| Ammonium chloride | 0.1 | 0.1 | 0.1 | — |
| Suds Suppressor[6] | — | — | — | 0.1 |
| Novel polydimethylsiloxane-polyether copolymers of Copolymer 1-6 (mixtures thereof may also be used) | 2.0 | 5.0 | 2.0 | 2.0 |
| Perfume | 0.85 | 2.0 | 0.85 | 1.0 |
| Perfume microcapsule[7] | 0.65 | 0.75 | 0.65 | 0.3 |
| Water, suds suppressor, stabilizers, pH control agents, buffers, dyes & other optional ingredients | to 100% pH = 3.0 | to 100% pH = 3.0 | to 100% pH = 3.0 | to 100% pH = 3.0 |

[1]N,N di(tallowoyloxyethyl)-N,N dimethylammonium chloride available from Evonik Corporation, Hopewell, VA.
[2]Reaction product of fatty acid with Methyldiethanolamine, quaternized with Methylchloride, resulting in a 2.5:1 molar mixture of N,N-di(tallowoyloxyethyl) N,N-dimethylammonium chloride and N-(tallowoyloxyethyl) N-hydroxyethyl N,N-dimethylammonium chloride available from Evonik Corporation, Hopewell, VA.
[3]Cationic starch based on common maize starch or potato starch, containing 25% to 95% amylose and a degree of substitution of from 0.02 to 0.09, and having a viscosity measured as Water Fluidity having a value from 50 to 84. Available from National Starch, Bridgewater, NJ
[4]Available from Nippon Shokubai Company, Tokyo, Japan under the trade name Epomin 1050.
[5]Cationic polyacrylamide polymer such as a copolymer of acrylamide/[2-(acryloylamino) ethyl]tri-methylammonium chloride (quaternized dimethyl aminoethyl acrylate) available from BASF, AG, Ludwigshafen under the trade name Sedipur 544.
[6]SILFOAM ® SE90 available from Wacker AG of Munich, Germany
[7]Available from Appleton Paper of Appleton, WI The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A household care composition comprising a linear polydimethylsiloxane-polyether copolymers with amino and/or quaternary ammonium groups, obtainable by the reaction of organopolysiloxanes functionalized with two, terminal secondary aminoalkyl groups with a chain-extended adduct bearing two, terminal glycidyl groups formed from the reaction of a diepoxide reacted with at least one amine compound.

2. The household care composition according to claim 1, wherein the household care composition is selected from the group consisting of liquid laundry detergent compositions, solid laundry detergent compositions, hard surface cleaning compositions, liquid hand dishwashing compositions, solid automatic dishwashing compositions, liquid automatic dishwashing, tab/unit dose form automatic dishwashing compositions, tab/unit dose form laundry care compositions, dryer bar compositions, dryer sheet coat mix compositions, fabric spray compositions, stain treatment composition, laundry detergent booster compositions, single rinse fabric softener compositions, and single rinse fabric enhancer compositions.

3. The household care composition according to claim 2, wherein the household care composition further comprises from about 0.1% to about 50% by weight of a surfactant selected from the group consisting of anionic, cationic, amphoteric, nonionic surfactants, and combinations thereof.

4. The household care composition of claim 3, wherein the household care composition further comprises an adjunct selected from the group consisting of delivery enhancing agents, fluorescent whitening agents, enzymes, rheology modifiers, builders, and mixtures thereof.

5. The household care composition of claim 4, wherein the household care composition further comprises a delivery enhancing agent.

6. The household care composition according to claim 1, wherein the household care composition comprises from about 0.01% to about 15% by weight of the composition of said linear polydimethylsiloxane-polyether copolymers.

7. The household care composition according to claim 1, having copolymers of formula (4)

$$H\text{-}A\text{-}[(B\text{—}C)_x\text{—}B\text{-}A]_y\text{-}H \qquad \text{Formula (4)}$$

where A is a siloxane fragment from the structure of the aminosiloxane of the formula (3)

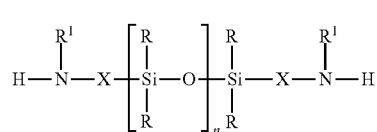

Formula (3)

according to formula (5)

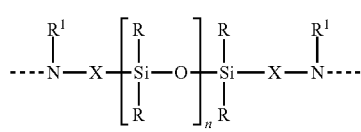

Formula (5)

B is an organic fragment which arises from the epoxy ring opening of a diglycidyl ether of the formula (1)

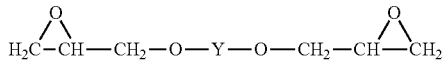

Formula (1)

according to formula (6)

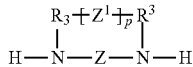

Formula (6)

and
C is a fragment from an amine structure of the formula (2)

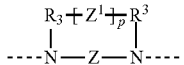

Formula (2)

according to formula (7)

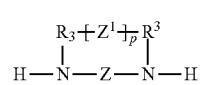

Formula (7)

where
X is a divalent linear or branched hydrocarbon radical which has 1-20 carbon atoms and is optionally interrupted by nitrogen atoms or aminic groups;
Y is any divalent organic hydrocarbon radical which may be interrupted by oxygen atoms;
Z is a divalent linear or branched hydrocarbon radical which may be interrupted by heteroatoms O and N or may in turn be substituted by N- or O-containing groups; and Z is an alkylene group having 2 to 18 carbon atoms;
$Z^1$ is independently a Z radical;
R is an alkyl radical having 1-8 carbon atoms;
$R^1$ is any hydrocarbon radical;
$R^2$ is hydrogen or an alkyl group having 1-4 carbon atoms;
$R^3$ is independently a linear or branched aliphatic hydrocarbon radical which may be interrupted by heteroatoms O and N, or which may in turn be substituted by N- or O-containing groups or is a cycloaliphatic radical; $R^3$ is monovalent when p is 0, or divalent when p is 1;
n is an integer from 1 to 500;
m is an integer from 0 to 50;
p is either 0 or 1;
x is from 0.1 to 10; and
y is from 1.1 to 50.

8. The household care composition of claim 7 wherein said copolymers of the formula (4) have been neutralized with acids and/or quaternized with alkylating agents and bear ammonium groups.

9. The household care composition according to claim 7 further comprising at least one additional component selected from the group consisting of emollients, emulsifiers and surfactants, thickeners/viscosity regulators/stabilizers, UV light protection filters, antioxidants, hydrotropes or polyols, solids and fillers, film formers, pearlescent additives, insect repellents, preservatives, conditioners, perfumes, dyes, care additives, and solvents.

10. A household care composition which comprises polydimethylsiloxane-polyether copolymers with amino and/or quaternary ammonium groups obtainable by a process comprising the steps of:
a) a diepoxide is first reacted with at least one amine compound to give a chain-extended adduct bearing a terminal glycidyl group, the molar ratio of diepoxide to amine being variable but at least greater than 1:1 to form a an intermediate, and
b) this intermediate is then reacted with a linear polysiloxane bearing two, terminal secondary amino groups,
c) optionally, the nitrogen atoms can be completely or partially neutralized at any point in this process by adding acids, and
d) also optionally, water or organic compounds selected from the group of polyethers, polyols, and alcohols are added as diluents, emulsifiers or modifiers; thereby making said polydimethylsiloxane-polyether copolymers with amino and/or quaternary ammonium groups.

11. The household care composition according to claim 10, wherein the diepoxides used are compounds of the formula (1)

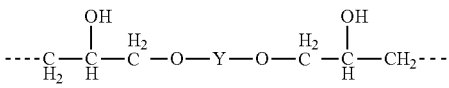

Formula (1)

where Y is any divalent organic hydrocarbon radical which may be interrupted by oxygen atoms.

12. The household care composition according to claim 11, wherein Y is a divalent polyether radical of the

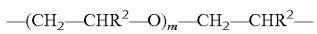

type, where m is an integer from 0 to 50 and $R^2$ is hydrogen or an alkyl group having 1-4 carbon atoms.

13. The household care composition according to claim 10, wherein the amine compounds used in process step (a) are di-secondary amines of the formula (2)

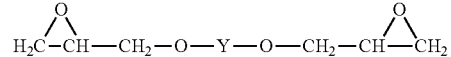

Formula (2)

where
$R^3$ is independently a linear or branched aliphatic hydrocarbon radical which may be interrupted by heteroatoms O and N, or which may in turn be substituted by N- or O-containing groups or is a cycloaliphatic radical; $R^3$ is monovalent when p is 0, or divalent when p is 1;
Z is a divalent linear or branched hydrocarbon radical which may be interrupted by heteroatoms O and N or may in turn be substituted by N- or O-containing groups; and Z is an alkylene group having 2 to 18 carbon atoms;
$Z^1$ is independently a Z radical; and
p is either 0 or 1.

14. The household care composition according to claim 13, wherein the compound of the formula (2) is a cyclic amine where p is 1 or a linear diamine, or the two nitrogen atoms are constituents of a heterocyclic fragment.

15. The household care composition according to claim 14, wherein the compound of the formula (2) used is piperazine or N,N'-dimethylhexamethylene-1,6-diamine or N,N'-dimethyltetramethylene-1,4-diamine.

16. The household care composition according to claim 10 wherein the compounds used in reaction step (b) are linear polysiloxanes which have terminal secondary amino groups and are of the formula (3)

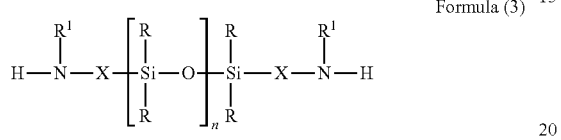

Formula (3)

where

R is an alkyl radical having 1-8 carbon atoms, $R^1$ is any hydrocarbon radical, X is a divalent linear or branched hydrocarbon radical which has 1-20 carbon atoms and is optionally interrupted by nitrogen atoms or aminic groups, and n is an integer from 1 to 500.

17. The household care composition according to claim 10, wherein an acid or an alkylating reagent is added in process step (c).

* * * * *

UNITED STATES PATENT AND TRADEMARK OFFICE
CERTIFICATE OF CORRECTION

PATENT NO. : 8,158,572 B2  
APPLICATION NO. : 13/015852  
DATED : April 17, 2012  
INVENTOR(S) : Schubert et al.

Page 1 of 1

It is certified that error appears in the above-identified patent and that said Letters Patent is hereby corrected as shown below:

In the Claims

Column 30, Claim 3
  Line 1, delete "3." and insert -- 7. --.

Column 30, Claim 4
  Line 1, delete "4." and insert -- 8. --.

Column 30, Claim 4
  Line 1, delete "claim 3" and insert -- claim 7 --.

Column 30, Claim 5
  Line 1, delete "5." and insert -- 9. --.

Column 30, Claim 5
  Line 1, delete "claim 4" and insert -- claim 8 --.

Column 30, Claim 6
  Line 1, delete "6." and insert -- 3. --.

Column 30, Claim 7
  Line 1, delete "7." and insert -- 4. --.

Column 31, Claim 8
  Line 1, delete "8." and insert -- 5. --.

Column 31, Claim 8
  Line 1, delete "claim 7" and insert -- claim 4 --.

Column 31, Claim 9
  Line 1, delete "9." and insert -- 6. --.

Column 31, Claim 9
  Line 1, delete "claim 7" and insert -- claim 4 --.

Signed and Sealed this  
Thirtieth Day of April, 2013

Teresa Stanek Rea  
*Acting Director of the United States Patent and Trademark Office*